US010565465B2

(12) United States Patent
Yamada

(10) Patent No.: US 10,565,465 B2
(45) Date of Patent: Feb. 18, 2020

(54) IMAGE PROCESSING APPARATUS THAT IDENTIFIES CHARACTER PIXEL IN TARGET IMAGE USING FIRST AND SECOND CANDIDATE CHARACTER PIXELS

(71) Applicant: BROTHER KOGYO KABUSHIKI KAISHA, Nagoya, Aichi (JP)

(72) Inventor: Ryuji Yamada, Ogaki (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/553,591

(22) Filed: Aug. 28, 2019

(65) Prior Publication Data
US 2019/0392245 A1   Dec. 26, 2019

Related U.S. Application Data

(63) Continuation of application No. 16/136,422, filed on Sep. 20, 2018, now Pat. No. 10,423,854.

(30) Foreign Application Priority Data

Sep. 20, 2017 (JP) .................................. 2017-180593
Mar. 16, 2018 (JP) .................................. 2018-050232

(51) Int. Cl.
*G06K 9/46*       (2006.01)
*G06K 9/32*       (2006.01)
(Continued)

(52) U.S. Cl.
CPC ......... *G06K 9/4604* (2013.01); *G06K 9/3233* (2013.01); *G06K 9/42* (2013.01);
(Continued)

(58) Field of Classification Search
CPC ...... G06K 9/4604; G06K 9/4642; G06K 9/42; G06K 9/3233; G06K 9/4652; G06K 2209/01; H04N 1/393; H04N 1/4092
(Continued)

(56) References Cited

U.S. PATENT DOCUMENTS

2004/0165081 A1\* 8/2004 Shibaki .................... H04N 1/56
                                                                348/222.1
2008/0310721 A1   12/2008 Yang et al.
(Continued)

FOREIGN PATENT DOCUMENTS

JP        H04-318659 A       11/1992
JP        H06-164928 A        6/1994
(Continued)

OTHER PUBLICATIONS

Notice of Allowance dated Aug. 5, 2019 issued in U.S. Appl. No. 16/136,422.

*Primary Examiner* — Allen H Nguyen
(74) *Attorney, Agent, or Firm* — Scully, Scott, Murphy & Presser, P.C.

(57) ABSTRACT

In an image processing apparatus, a controller is configured to perform: acquiring target image data representing a target image including a plurality of pixels; determining a plurality of first candidate character pixels from among the plurality of pixels, determination of the plurality of first candidate character pixels being made for each of the plurality of pixels; setting a plurality of object regions in the target image; determining a plurality of second candidate character pixels from among the plurality of pixels, determination of the plurality of second candidate character pixels being made for each of the plurality of object regions according to a first determination condition; and identifying a character pixel from among the plurality of pixels, the character pixel (Continued)

being included in both the plurality of first candidate character pixels and the plurality of second candidate character pixels.

6 Claims, 22 Drawing Sheets

(51) Int. Cl.
   *G06K 9/42* (2006.01)
   *H04N 1/393* (2006.01)
   *H04N 1/409* (2006.01)
(52) U.S. Cl.
   CPC ......... *G06K 9/4642* (2013.01); *G06K 9/4652* (2013.01); *H04N 1/393* (2013.01); *G06K 2209/01* (2013.01); *H04N 1/4092* (2013.01)
(58) Field of Classification Search
   USPC .......................................................... 358/1.2
   See application file for complete search history.

(56) References Cited

U.S. PATENT DOCUMENTS

| | | | |
|---|---|---|---|
| 2009/0161955 A1* | 6/2009 | Isshiki | .................. G06K 9/348 382/177 |
| 2012/0147437 A1 | 6/2012 | Nagai | |
| 2014/0118797 A1* | 5/2014 | Henmi | .............. H04N 1/00331 358/461 |
| 2015/0138334 A1 | 5/2015 | Usaba et al. | |
| 2017/0270378 A1 | 9/2017 | Guan | |

FOREIGN PATENT DOCUMENTS

| | | |
|---|---|---|
| JP | 2003-189090 A | 7/2003 |
| JP | 2017-135609 A | 8/2017 |

* cited by examiner

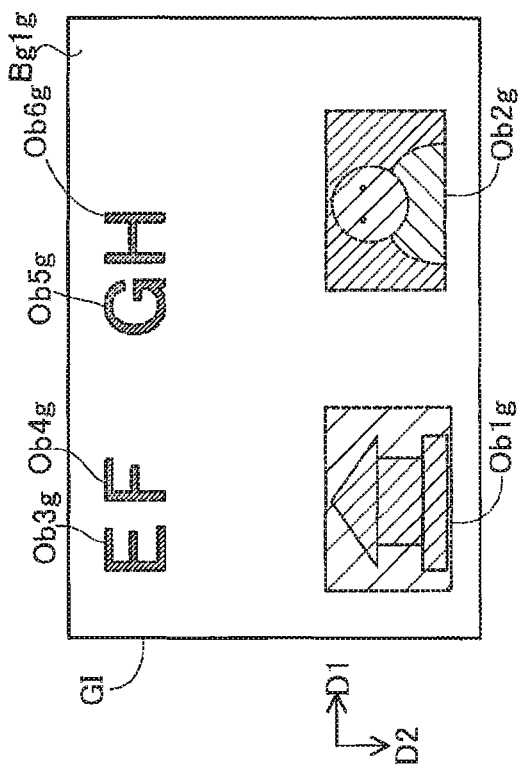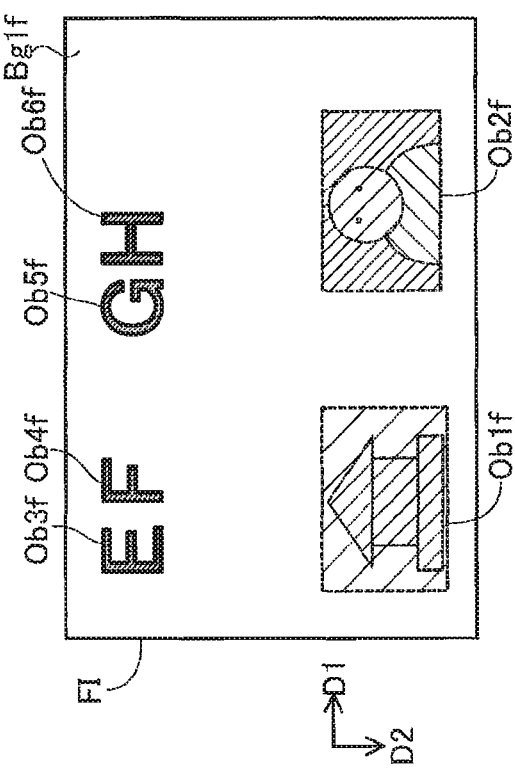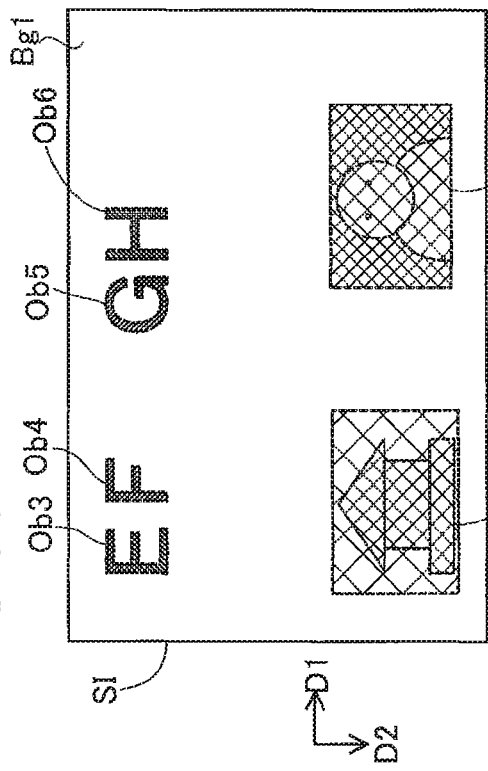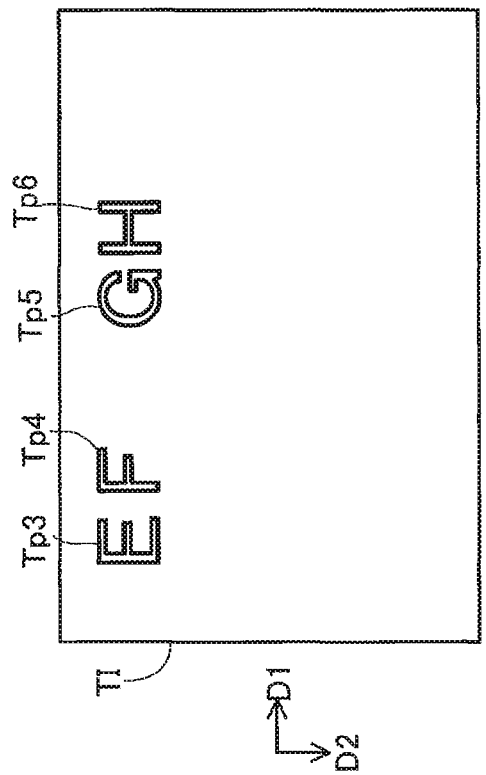

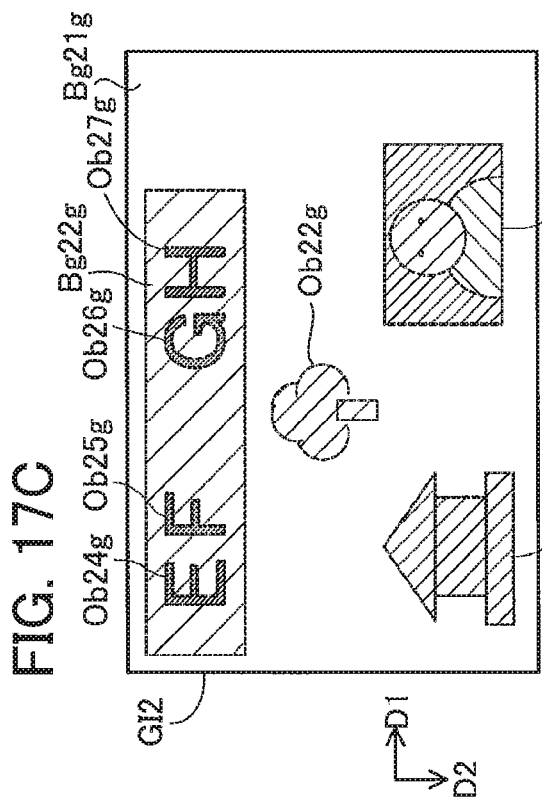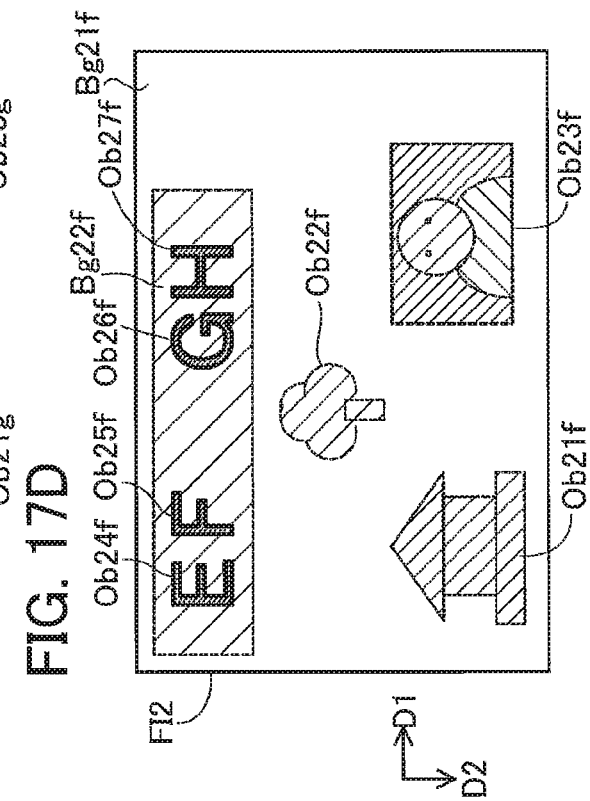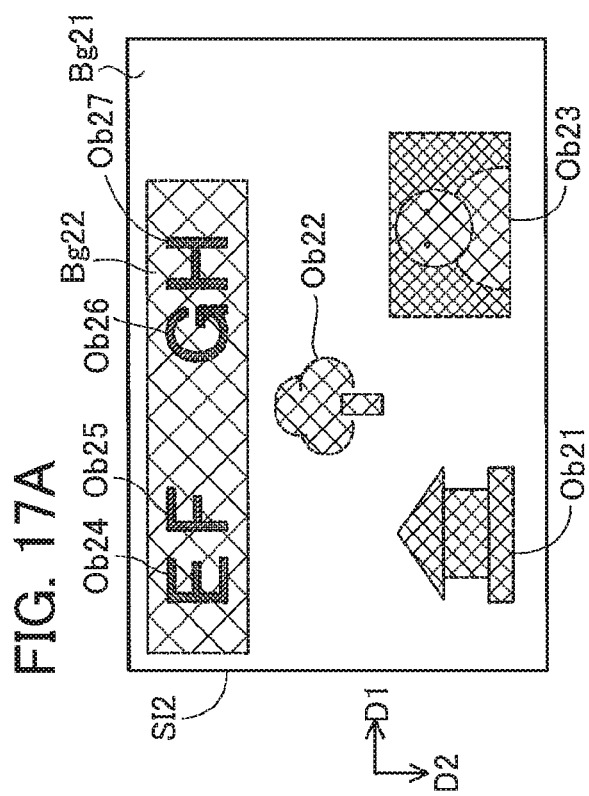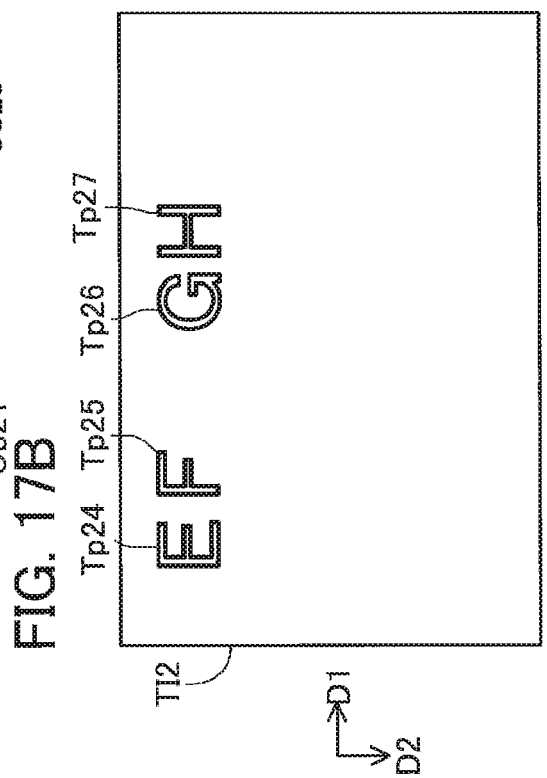

FIG. 21A
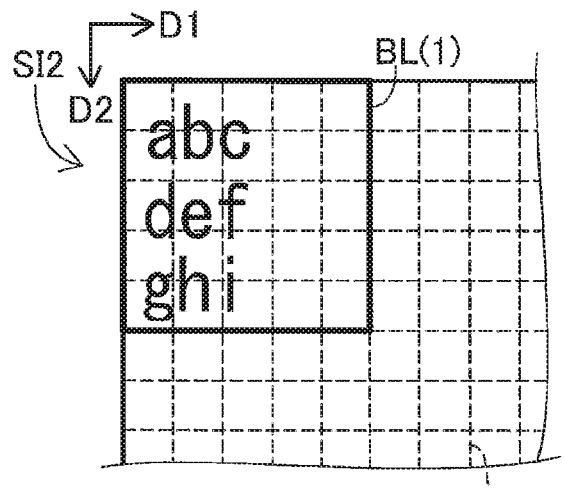
FIG. 21B
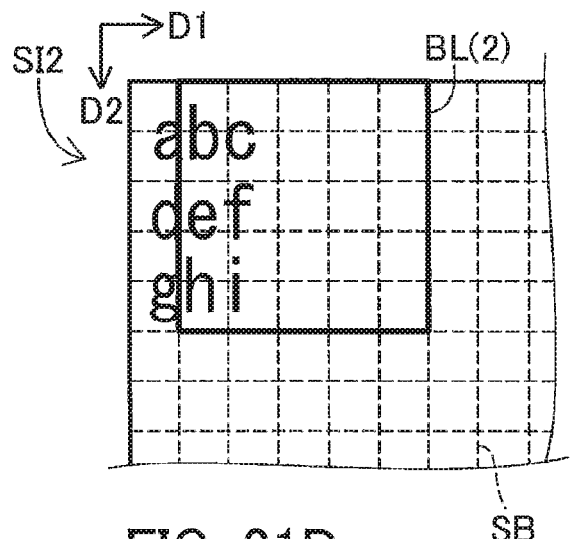
FIG. 21C
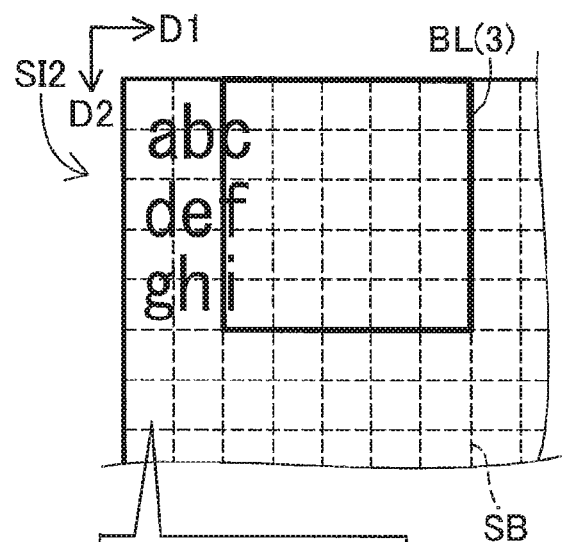
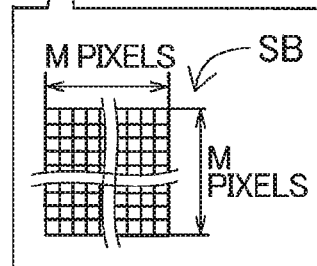
FIG. 21D
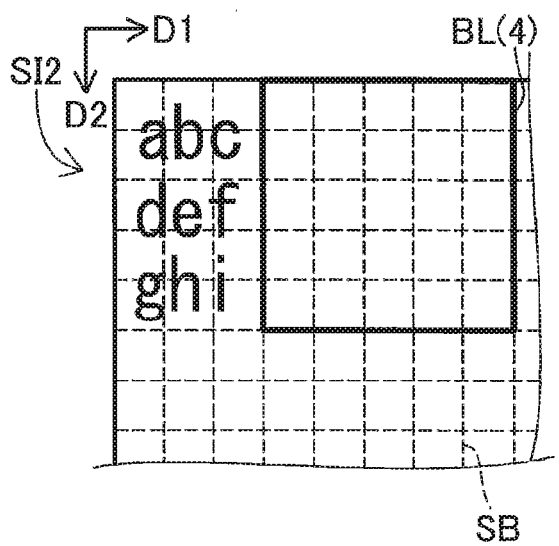

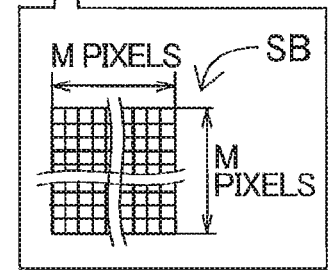

IMAGE PROCESSING APPARATUS THAT IDENTIFIES CHARACTER PIXEL IN TARGET IMAGE USING FIRST AND SECOND CANDIDATE CHARACTER PIXELS

CROSS REFERENCE TO RELATED APPLICATION

This application is a continuation application of U.S. Ser. No. 16/136,422 filed on Sep. 20, 2018 and claims priority from Japanese Patent Application No. 2017-180593 filed Sep. 20, 2017 and Japanese Patent Application No. 2018-050232 filed Mar. 16, 2018. The entire content of each of these priority applications is incorporated herein by reference.

TECHNICAL FIELD

The present disclosure relates to an image process performed on image data that was generated using an image sensor to read printed matter, and particularly to an image process for identifying character pixels in an image.

BACKGROUND

If image data is generated by reading printed matter with an image sensor, halftone dots in the printed matter appear in the image represented by this image data. When processing the image data to identify character pixels in the image, pixels constituting halftone dots are often misidentified as character pixels.

A conventional image processing apparatus executes an edge determination for each pixel of an image to determine whether the pixel represents an edge, and a halftone dot determination for each pixel to determine whether the pixel represents a halftone dot. The image processing device identifies pixels that are edges but not halftone dots as pixels representing a character (i.e., text).

SUMMARY

Thus, a technique is needed for reliably identifying character pixels in images that include halftone dots. The technique must reduce the likelihood of pixels constituting halftone dots being misidentified as character pixels in regions of an image having no characters.

In view of the foregoing, it is an object of the present disclosure to provide a technique for accurately identifying character pixels in a target image, even when the image includes halftone dots.

In order to attain the above and other objects, the present disclosure provides an image processing apparatus including a controller. The controller is configured to perform: (a) acquiring target image data representing a target image, the target image including a plurality of pixels; (b) determining a plurality of first candidate character pixels from among the plurality of pixels, each of the plurality of first candidate character pixels being a candidate to be a character pixel, determination of the plurality of first candidate character pixels being made for each of the plurality of pixels; (c) setting a plurality of object regions in the target image, each of the plurality of object regions including a plurality of object pixels; (d) determining a plurality of second candidate character pixels from among the plurality of pixels, each of the plurality of second candidate character pixels being a candidate to be the character pixel, determination of the plurality of second candidate character pixels being made for each of the plurality of object regions according to a first determination condition; and (e) identifying the character pixel from among the plurality of pixels, the character pixel being included in both the plurality of first candidate character pixels and the plurality of second candidate character pixels.

According to another aspect, the present disclosure provides an image processing method including: acquiring target image data representing a target image, the target image including a plurality of pixels; determining a plurality of first candidate character pixels from among the plurality of pixels, each of the plurality of first candidate character pixels being a candidate to be a character pixel, determination of the plurality of first candidate character pixels being made for each of the plurality of pixels; setting a plurality of object regions in the target image, each of the plurality of object regions including a plurality of object pixels; determining a plurality of second candidate character pixels from among the plurality of pixels, each of the plurality of second candidate character pixels being a candidate to be the character pixel, determination of the plurality of second candidate character pixels being made for each of the plurality of object regions according to a first determination condition; and identifying the character pixel from among the plurality of pixels, the character pixel being included in both the plurality of first candidate character pixels and the plurality of second candidate character pixels.

BRIEF DESCRIPTION OF THE DRAWINGS

The particular features and advantages of the disclosure as well as other objects will become apparent from the following description taken in connection with the accompanying drawings, in which:

FIGS. 3A to 3D are first views illustrating an example of images used in the image process of the first embodiment, in which FIG. 3A illustrates an example of a scanned image represented by scan data, FIG. 3B illustrates an example of a character identification image represented by character identification data, FIG. 3C illustrates an example of a smoothed image represented by smoothed image data, and FIG. 3D illustrates an example of a processed image represented by processed image data;

FIGS. 4A and 4B illustrate an example of images used in character identification process of the first embodiment, in which FIG. 4A illustrates an example of an edge identification image represented by edge identification data, and FIG. 4B illustrates an example of a non-character region image represented by non-character region data;

FIGS. 7A to 7C are explanatory diagrams illustrating R-component image data, smoothed R-component image data, and edge-enhanced R-component image data, in which FIG. 7A is a graph conceptually illustrating the R-component image data prior to undergoing a smoothing process, FIG. 7B is a graph conceptually illustrating the smoothed R-component image data that has undergone the smoothing process, and FIG. 7C is a graph conceptually illustrating the edge-enhanced R-component image data that has undergone an edge enhancement process;

FIGS. 11A to 11C are second views respectively illustrating examples of images used in the image process of the first embodiment and a comparative example, in which FIG. 11A illustrates an enlarged view of a halftone region extracted from the scanned image represented by the scan data, FIG. 11B illustrates an enlarged view of the halftone region extracted from a minimum component image represented by minimum component data, and FIG. 11C illustrates an enlarged view of the halftone region extracted from a luminance image represented by luminance image data as the comparative example;

FIGS. 13A and 13B illustrate an example of images used in the non-character region identification process, in which FIG. 13A illustrates an example of a pre-expansion image, and FIG. 13B illustrates an example of a pre-processed image;

FIGS. 14A to 14C are first views illustrating an expansion process and a contraction process executed by the multifunction peripheral according to the first embodiment, in which FIG. 14A illustrates a partial image of the pre-expansion image that includes a fine line corresponding to a character in the scanned image, FIG. 14B illustrates an expanded partial image corresponding to the partial image in FIG. 14A, and FIG. 14C illustrates a contracted partial image corresponding to the partial image in FIG. 14B;

FIGS. 15A to 15C are second views illustrating the expansion process and the contraction process executed by the multifunction peripheral according to the first embodiment, in which FIG. 15A illustrates a partial image of the pre-expansion image constituting a partial region corresponding to a photo in the scanned image, FIG. 15B illustrates an expanded partial image corresponding to the partial image in FIG. 15A, and FIG. 15C illustrates a contracted partial image corresponding to the partial image in FIG. 15B;

FIGS. 17A to 17D are views illustrating an example of images used in the image process of the second embodiment, in which FIG. 17A illustrates an example of a scanned image represented by scan data, FIG. 17B illustrates an example of a character identification image represented by character identification data, FIG. 17C illustrates an example of a smoothed image represented by smoothed image data, and FIG. 17D illustrates an example of a processed image represented by processed image data;

FIGS. 18A and 18B illustrate an example of images used in a character identification process of the second embodiment, in which FIG. 18A illustrates an example of an edge identification image represented by edge identification data, and FIG. 18B illustrates an example of a block determination image represented by block determination data;

FIGS. 21A to 21D illustrate samples of determinations for individual blocks, in which FIGS. 21A and 21B illustrate an example of blocks determined to be a character block, FIG. 21C illustrates an example of a block determined to be an unknown block, and FIG. 21D illustrates an example of a block determined to be a non-character block;

FIGS. 22A to 22D conceptually illustrate the block determination images represented by the block determination data, in which FIGS. 21A and 21B illustrate an example of setting pixel values in the block determination data of blocks determined to be a character block, FIG. 21C illustrates an example of setting pixel values in the block determination data of a block determined to be an unknown block, and FIG. 21D illustrates an example of setting pixel values in the block determination data of a block determined to a non-character block.

DETAILED DESCRIPTION

A. First Embodiment

A-1: Configuration of Multifunction Peripheral 200

Figure 1:
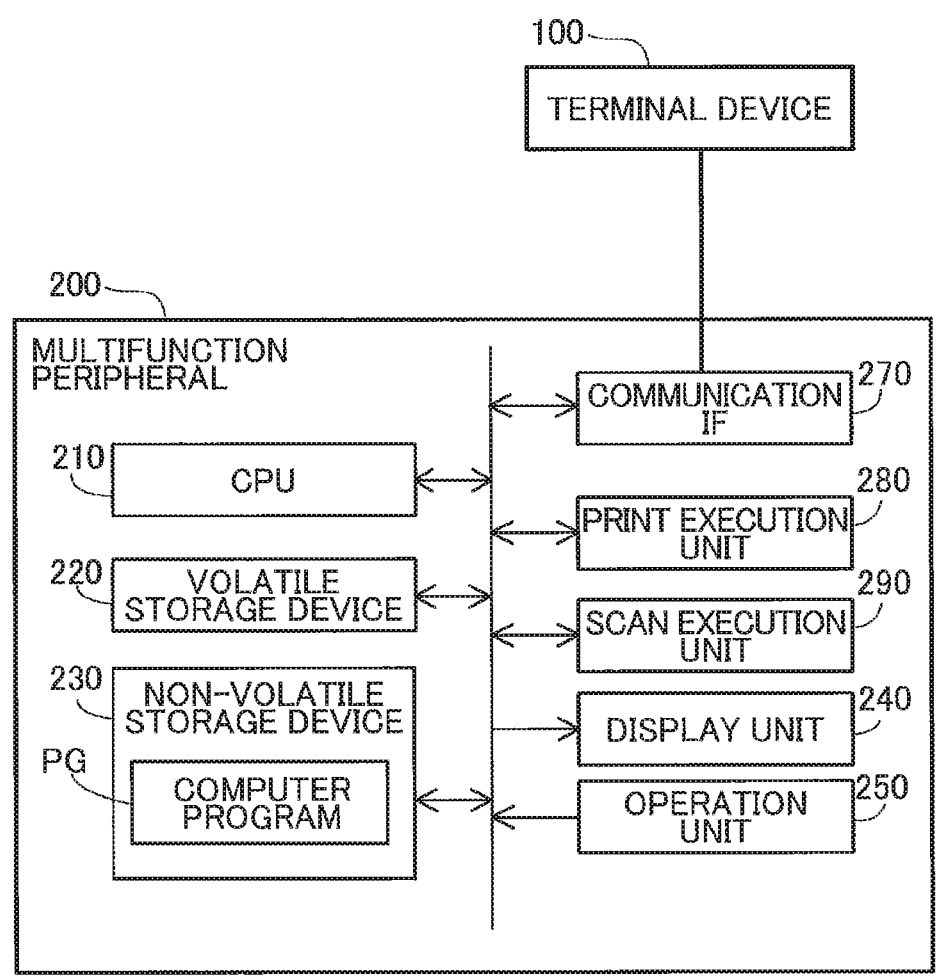
FIG. 1 is a block diagram illustrating a configuration of a multifunction peripheral according to one embodiment of the present disclosure.

An image processing apparatus according to one embodiment will be described while referring to the accompanying drawings wherein like parts and components are designated by the same reference numerals to avoid duplicating description. FIG. 1 is a block diagram illustrating the configuration of a multifunction peripheral 200 as an example of the image processing apparatus. The multifunction peripheral 200 includes a central processing unit (CPU) 210 which is a processor for controlling the multifunction peripheral 200, a volatile storage device 220 such as a dynamic random access memory (DRAM), a non-volatile storage device 230 such as a flash memory, a hard disk drive, or the like, a display unit 240 including a liquid crystal display and the like, an operation unit 250 including a touch panel and buttons superimposed on the liquid crystal display, an interface (communication IF) 270 for communicating with an external device such as a user terminal device 100, a print execution unit 280, and a scan execution unit 290.

The scan execution unit 290 optically reads an original using a linear image sensor under the control of the CPU 210 to thereby generate scan data. The print execution unit 280 uses a plurality of types of toner, specifically toner in the colors cyan (C), magenta (M), yellow (Y), and black (K), as colorants, to print an image on a print medium such as a sheet of paper by a laser method under the control of the CPU 210. More specifically, the print execution unit 280 exposes a photosensitive drum to form an electrostatic latent image and then makes the toner adhere to the electrostatic latent image to thereby form a toner image. The print execution unit 280 transfers the toner image formed on the photosensitive drum onto the paper. As a modification, the print execution unit 280 may be a print execution unit of an inkjet system that ejects ink as colorants to form an image on the paper.

The volatile storage device 220 provides a buffer area for temporarily storing various intermediate data generated when the CPU 210 performs processes. The non-volatile storage device 230 stores a computer program PG therein. The computer program PG is a control program allowing the CPU 210 to perform control of the multifunction peripheral 200. In the present embodiment, the computer program PG is previously stored in the non-volatile storage device 230 at the time of manufacturing the multifunction peripheral 200. Alternatively, the computer program PG may be provided by being downloaded from a server or by being stored in a DVD-ROM, and the like. The CPU 210 executes the computer program PG to thereby execute an image process to be described later.

A-2: Image Process

Figure 2:
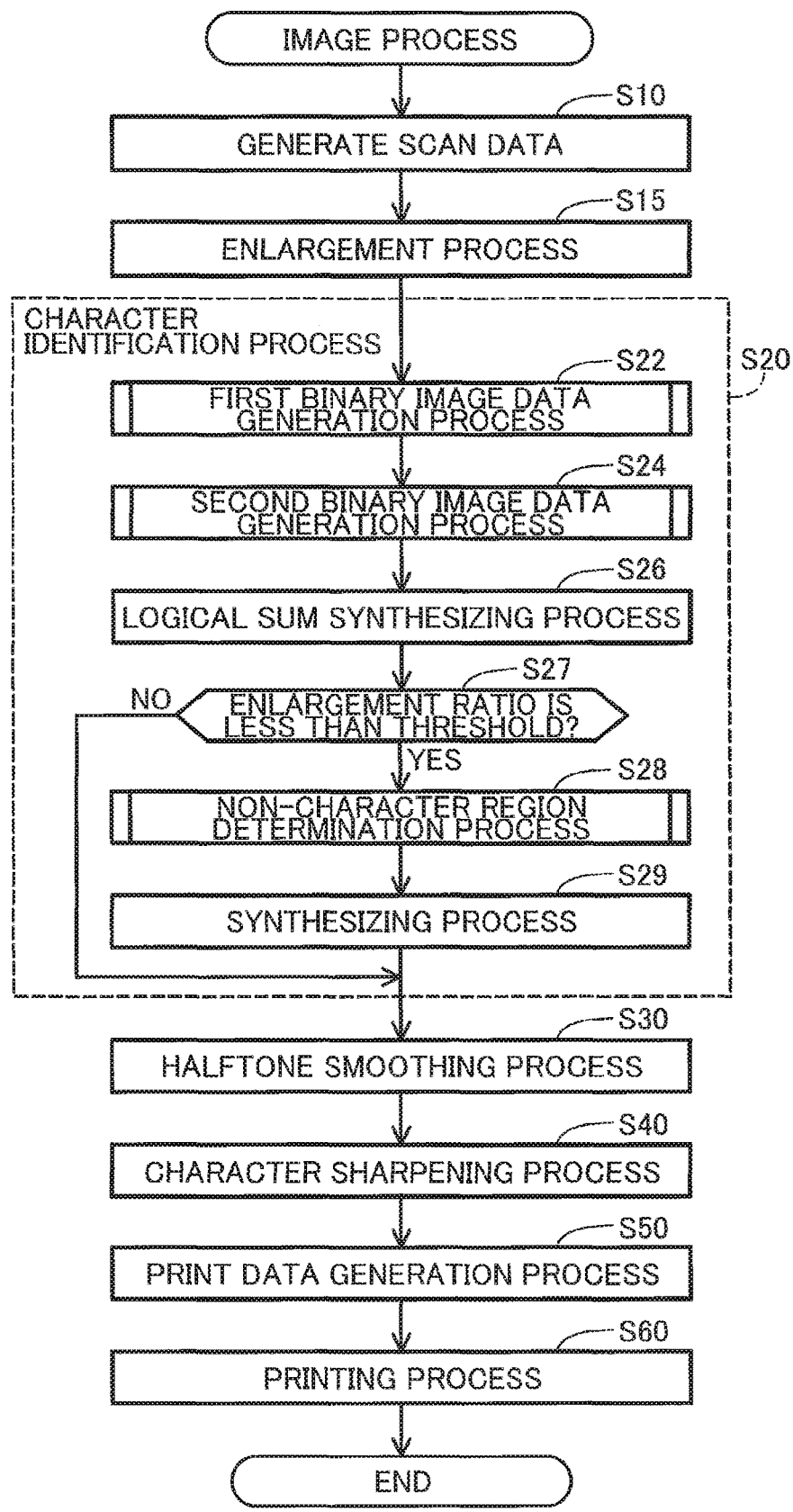
FIG. 2 is a flowchart illustrating steps in an image process executed by the multifunction peripheral according to a first embodiment.

FIG. 2 is a flowchart illustrating steps in an image process. The CPU 210 executes this image process when the user places an original on an original platen of the scan execution unit 290 and the user operation is made on the operation unit 250 to input a copy command, for example. This image process implements the copy function of the multifunction peripheral 200, wherein the scan execution unit 290 reads an original to generate scan data, and the scan data is used to generate print data representing the original.

In S10 the CPU 210 generates scan data as target image data by using the scan execution unit 290 to read the original that the user has placed on the original platen. The original is printed matter containing an image that was printed by the multifunction peripheral 200 or a printer (not illustrated). The CPU 210 stores the generated scan data in a buffer area of the volatile storage device 220 (see FIG. 1). The scan data includes values for each of a plurality of pixels. The values for each pixel represent the color of the pixel with color values in the RGB color space (hereinafter called RGB values). That is, the scan data is RGB image data. RGB values for a single pixel include three color component values for red (R), green (G), and blue (B) (hereinafter also called the R value, G value, and B value). In the present embodiment, each component value is set to one of possible 256 gradation values.

The scan data, which is configured of RGB image data, may be said to include three sets of component image data (R-component image data, G-component image data, and B-component image data) corresponding to the three color components that constitute the RGB color space. Each set of component image data specifies the pixel value of the corresponding color component for each pixel in the image.

In S15 the CPU 210 executes an enlargement process on the scan data to enlarge the scanned image represented by this scan data by an enlargement ratio Lr, thereby generating enlarged scan data. The user operation is made on the operation unit 250 to input the enlargement ratio Lr together with the copy execution command, for example. The enlargement ratio Lr is set to a value within the range 0.1 to 6 (10 to 600%). An enlargement process performed using an enlargement ratio Lr less than 1 reduces the size of the scanned image, while an enlargement process using an enlargement ratio Lr greater than 1 increases the size of the scanned image. Specifically, the size of the scanned image is defined by the number of pixels in both vertical and horizontal directions. Here, scan data that has not yet undergone the enlargement process will be also called the original image data, and scan data that has undergone the enlargement process will be also called the target image data. In the following description, the use of "scan data" by itself will signify scan data that has been subjected to the enlargement process.

FIGS. 3A to 3D are first views illustrating an example of images used in the image process. FIG. 3A illustrates an example of a scanned image SI represented by scan data. The scanned image SI is configured of a plurality of pixels arranged in a matrix that has a first direction D1, and a second direction D2 orthogonal to the first direction D1. Note that the horizontal direction and vertical direction correspond to the first direction D1 and second direction D2 illustrated in FIGS. 3A to 3D, respectively. Hereinafter, for the purpose of illustration, the upstream and downstream sides in the first direction D1 will be also described as the left and right, respectively, and the upstream and downstream sides in the second direction D2 will be also described as the top and bottom, respectively.

The scanned image SI illustrated in FIG. 3A includes a white background Bg1 indicating the base color of the paper constituting the original, two objects Ob1 and Ob2 that are not characters, and four objects Ob3 to Ob6 that are characters. In the present embodiment, the non-character objects are photos. Hereinafter, the objects Ob1 and Ob2 are also called photo objects Ob1 and Ob2, and objects Ob3 to Ob6 are also called character objects Ob3 to Ob6.

In S20 the CPU 210 executes a character identification process on the scan data. The character identification process is performed to identify character images by sorting the pixels in the scanned image SI into a plurality of character pixels representing characters and a plurality of non-character pixels not representing characters.

By performing the character identification process, the CPU 210 generates binary image data specifying a "1" value for each character pixel and a "0" value for each non-character pixel (hereinafter called character identification data), for example. FIG. 3B illustrates an example of a character identification image TI represented by the character identification data. In this character identification image TI, the pluralities of pixels constituting edges of the four character objects Ob3 to Ob6 in the scanned image SI are identified as character pixels Tp3 to Tp6. Note that only pixels constituting the edges of characters are identified as character pixels in the case of relatively large characters, while all pixels constituting the characters are identified as character pixels in the case of relatively small characters. The character identification process will be described later in greater detail.

In S30 the CPU 210 executes a halftone smoothing process on the scan data to generate smoothed image data representing a smoothed image. Specifically, the CPU 210 executes a smoothing process on each of the values for the plurality of non-character pixels included in the scan data using a smoothing filter, such as a Gaussian filter. The CPU 210 identifies non-character pixels to be subjected to the smoothing process by referencing the character identification data generated in the character identification process of S20. The CPU 210 generates smoothed image data that includes values for a plurality of character pixels in the scan data, and values for a plurality of non-character pixels that have undergone the smoothing process.

FIG. 3C illustrates an example of a smoothed image GI represented by the smoothed image data. The smoothed image GI includes a white background Bg1g, and objects Ob1g to Ob6g produced by smoothing the objects Ob1 to Ob6 in the scanned image SI. Portions of these objects Ob1g to Ob6g and background Bg1g other than the character objects Ob3g to Ob6g (hereinafter called non-character portions) are smoothed through comparison with the scanned image SI.

In S40 the CPU 210 executes a character sharpening process on the smoothed image data to generate processed image data. Specifically, the CPU 210 executes a sharpening process, such as an unsharp masking process or a process applying a sharpening filter, on each of the values of the plurality of character pixels in the smoothed image data, and calculates the values of the plurality of character pixels resulting from this sharpening process. The CPU 210 identifies character pixels to be subjected to this sharpening process by referencing the character identification data generated in the character identification process of S20. Next, the CPU 210 generates processed image data that includes values of the non-character pixels in the smoothed image data (values of non-character pixels that have undergone the smoothing process), and values of the character pixels that have undergone the sharpening process. The values of character pixels in the smoothed image data were not subjected to the smoothing process and, therefore, are the same as the values of character pixels in the scan data. Hence, it is no different to say that the character sharpening process of this step is executed on the values of character pixels in the scan data.

FIG. 3D illustrates an example of a processed image H represented by the processed image data. The processed image H includes a white background Bg1f, and objects Ob1f to Ob6f corresponding to the objects Ob1 to Ob6 in the scanned image SI. The edges of the character objects Ob3f to Ob6f among these objects are sharper than those of the character objects Ob3 to Ob6 in the scanned image SI and the character objects Ob3g to Ob6g in the smoothed image GI. The edges of the photo objects Ob1f and Ob2f have not been sharpened.

From the above description, it is clear that the objects Ob1f to Ob6f and the background Bg1f in the processed image FI include sharpened characters and smoothed non-characters.

In S50 the CPU 210 executes a print data generation process to generate print data from the processed image data. Specifically, the CPU 210 executes a color conversion process on the processed image data, which is configured of RGB image data, to generate CMYK image data representing the color of each pixel in CMYK values. The CMYK values are color values that include color components corresponding to the colorants used in printing (the C, M, Y, and K components). The CPU 210 executes the color conversion process using a lookup table well known in the art, for example. The CPU 210 executes a halftone process on this CMYK image data to generate dot data specifying the dot formation state of each pixel for each colorant used in printing. The dot formation states may be set to one of the two states "dot" and "no dot" or to one of the four states "large dot," "medium dot," "small dot," and "no dot." The halftone process may be implemented according to a dither method or an error diffusion method, for example. Next, the CPU 210 generates print data by rearranging the dot data in an order to be used for printing, and by adding print commands to the dot data.

In S60 the CPU 210 executes a printing process and subsequently ends the image process. Specifically, the CPU 210 supplies the print data to the print execution unit 280, controlling the print execution unit 280 to print the processed image.

Through the image process described above, the CPU 210 executes a first image process (specifically, an edge sharpening process) on values of a plurality of character pixels identified in the scan data (S40) and executes a second image process (specifically, a halftone smoothing process) different from the first image process on values of a plurality of non-character pixels (S30) to generate the processed image data. By executing different image processes on the values of pixels that are character pixels and the values of pixels that are not character pixels, a suitable image process can be performed on the scan data. Note, as a variation, the character sharpening process of S40 may be executed before the halftone smoothing process of S30.

More specifically, the CPU 210 generates processed image data that includes values for a plurality of character pixels that have undergone the sharpening process, and values for a plurality of non-character pixels that have undergone the smoothing process (S30, S40). As a result, the CPU 210 can generate processed image data representing an aesthetically pleasing processed image FI.

Values that have undergone the sharpening process are used in the processed image data for the character pixel values, as in the example of the processed image FI illustrated in FIG. 3D. This makes the characters appear sharper in the processed image FI, thereby improving the appearance of the printed processed image FI, for example.

Also in the processed image data, values that have undergone the smoothing process are used for the values of non-character pixels constituting objects in the processed image H other than characters, such as photos. This method suppresses the appearance of halftone dots, which can produce moiré patterns, for example, in parts of the processed image H other than characters, thereby suppressing the generation of moiré patterns and other artifacts in the printed processed image FI. Thus, this process can improve the aesthetic appearance of the printed processed image FI. This method also prevents edges in photos from being overly emphasized, thereby further improving the appearance of the processed image FI.

The original used for generating the scan data is printed matter on which an image has been printed, for example. Accordingly, when the image is viewed at the level of dots forming the image, halftone dots are formed in areas of the image having colors different from the white base color of the original. A halftone includes a plurality of dots and areas in which dots are not formed (portions indicating the base color of the original). Accordingly, when viewing the scanned image SI at the pixel level, halftones appear in portions of the scanned image SI having a color different from the white base color of the original. Dots in a halftone are arranged with periodic repetition owing to the effects of the dither matrix or the like used when printing the original. Thus, when printing an image based on scan data, the printed image is susceptible to moiré patterns due to interference between periodic components of halftone dots present in the original image (the scanned image SI) prior to undergoing the halftone process, and periodic components of dots in halftones constituting the printed image. In the processed image FI of the present embodiment, the smoothing process is performed to reduce the periodic components of dots in portions of the original image (the scanned image SI) excluding the edges. Using this processed image data to print the processed image FI can suppress the occurrence of moiré patterns in the printed processed image FI.

Generating print data using this processed image data (S50) is a particular feature of this image process as the resulting print data is suitable for suppressing moiré patterns that are prone to appear in the printed processed image FI.

A-3: Character Identification Process

Next, the character identification process of S20 in FIG. 2 will be described. In S22 the CPU 210 executes a first binary image data generation process using the scan data to generate first binary image data. The first binary image data is binary data specifying edge pixels and non-edge pixels. Here, edge pixels specified by the first binary image data will be called first edge pixels, and non-edge pixels specified by the first binary image data will be called first non-edge pixels. The first binary image data generation process will be described later in greater detail.

In S24 the CPU 210 executes a second binary image data generation process using the scan data to generate second binary image data. The second binary image data is binary data specifying edge pixels and non-edge pixels, similar to the first binary image data. However, the second binary image data differs from the first binary image data in that the second binary image data is generated according to a different process than that used to generate the first binary image data. Here, edge pixels specified by the second binary image data will be called second edge pixels, while non-edge pixels specified by the second binary image data will be called second non-edge pixels. The second binary image data generation process will be described later in greater detail.

In S26 the CPU 210 executes a logical sum synthesizing process to synthesize the first binary image data generated in S22 with the second binary image data generated in S24 to generate final binary image data specifying the identified edge pixels and non-edge pixels (hereinafter also called edge identification data). Specifically, the CPU 210 generates binary image data as edge identification data by taking the logical sum of values for corresponding pixel in the first binary image data and second binary image data for each pixel. That is, the CPU 210 ultimately identifies a set of pixels that includes the first edge pixels identified by the first binary image data and the second edge pixels identified by the second binary image data, but not pixels other than the first edge pixels and second edge pixels, as edge pixels. Thus, the CPU 210 can use the first binary image data and second binary image data to reliably determine whether pixels in the target image are edge pixels. This method can effectively reduce missed identifications for edge pixels in the scanned image SI, for example.

Edge pixels identified by the edge identification data become candidates for character pixels and, hence, will be called candidate character pixels. The edge identification data is binary image data whose values are set to "1" for candidate character pixels (edge pixels in the present embodiment) and "0" for pixels that are not candidates for character pixels (non-edge pixels in the present embodiment).

Figure 4A:
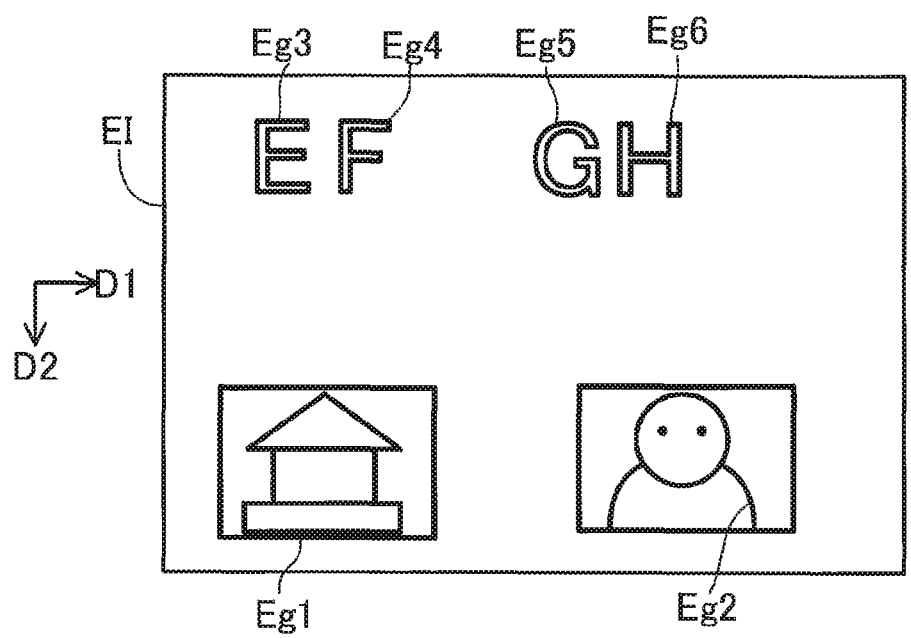
Figure 4B:
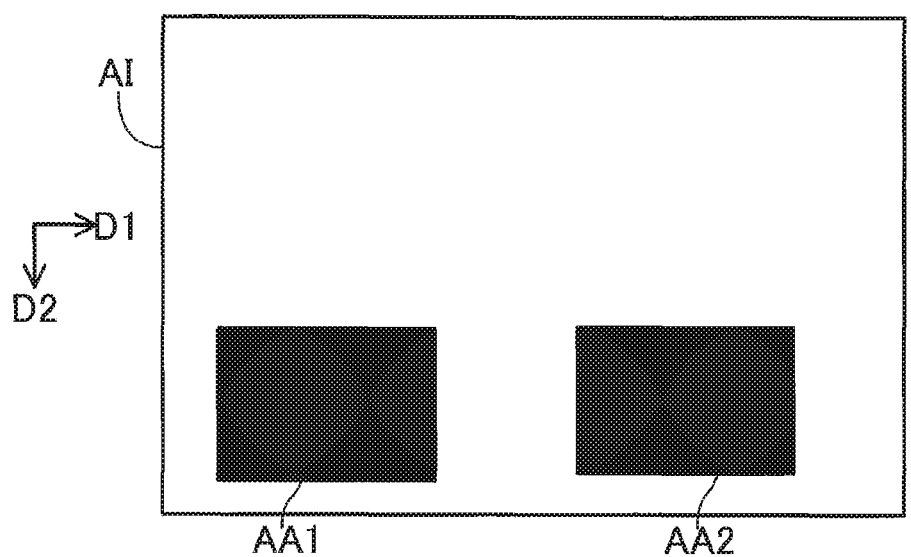

FIGS. 4A and 4B illustrate an example of images used in the character identification process. FIG. 4A illustrates an example of an edge identification image EI represented by the edge identification data. In this edge identification image EI, a plurality of edge pixels constituting edges Eg1 to Eg6 of the objects Ob1 to Ob6 in the scanned image SI have been identified as candidate character pixels. Thus, edges specified by the candidate character pixels include the edges of characters. These edges also include thin lines in objects other than characters (photos, for example).

In S27 the CPU 210 determines whether the enlargement ratio Lr used in the enlargement process of S15 is less than a threshold Lth. The threshold Lth of the enlargement ratio is set to 3 (300%), for example. When the enlargement ratio Lr is less than the threshold Lth (S27: YES), the CPU 210 advances to S28.

In S28 the CPU 210 executes a non-character region determination process on the scan data to identify non-character regions. That is, the CPU 210 generates binary image data (hereinafter called non-character region data) specifying a plurality of pixels constituting non-character regions and a plurality of pixels not constituting non-character regions. As will be described later in greater detail, the CPU 210 performs a determination in the non-character region determination process for each of the plurality of object regions provided in the scanned image SI using the scan data to determine whether each object region is a non-character region specifying an object other than a character (a photo, for example). The CPU 210 generates non-character region data on the basis of the determination results for each object region. The non-character region data is binary image data whose values are set to "1" for pixels constituting non-character regions and "0" for pixels not constituting non-character regions, for example.

FIG. 4B illustrates an example of a non-character region image AI represented by non-character region data. In this non-character region image AI, non-character regions AA1 and AA2 are identified as regions corresponding to the photo objects Ob1 and Ob2 in the scanned image SI.

In S29 the CPU 210 executes a synthesizing process to synthesize the edge identification data generated in S26 with the non-character region data generated in S28, producing the above described character identification data (see FIG. 3B) specifying character pixels and non-character pixels. Specifically, the CPU 210 identifies character pixels to be those pixels among the plurality of candidate character pixels identified by the edge identification data that are not positioned in the non-character regions positioned in the non-character regions AA1 and AA2 identified by the non-character region data. The CPU 210 identifies non-character pixels to be candidate character pixels identified by the edge identification data that are positioned in the non-character regions AA1 and AA2, and pixels that are not candidate character pixels. In other words, the CPU 210 identifies character pixels as the plurality of pixels in the scanned image SI set as candidate character pixels in S22 to S26 that fall in regions other than non-character regions set in S28. After generating the character identification data, the CPU 210 ends the character identification process.

On the other hand, if the CPU 210 determines in S27 that the enlargement ratio Lr is greater than or equal to the threshold Lth (S27: NO), the CPU 210 skips S28 and S29 and ends the character identification process. In this case, the edge identification data generated through the logical sum synthesizing process of S26 becomes the final character identification data. That is, in this case the CPU 210 identifies character pixels to be those pixels set as candidate character pixels in S22 to S26. As a variation, the CPU 210 may execute the determination in S27 after executing the non-character region determination process of S28. In other words, the CPU 210 may determine whether the enlargement ratio Lr is less than the threshold Lth after step S28. Here, the CPU 210 also executes the process in S29 to generate character identification data when the enlargement ratio Lr is less than the threshold Lth. If the enlargement ratio Lr is greater than or equal to the threshold Lth, the CPU 210 skips S29 and sets the edge identification data generated through the logical sum synthesizing process of S26 as the final character identification data.

A-4: First Binary Image Data Generation Process

Figure 5:
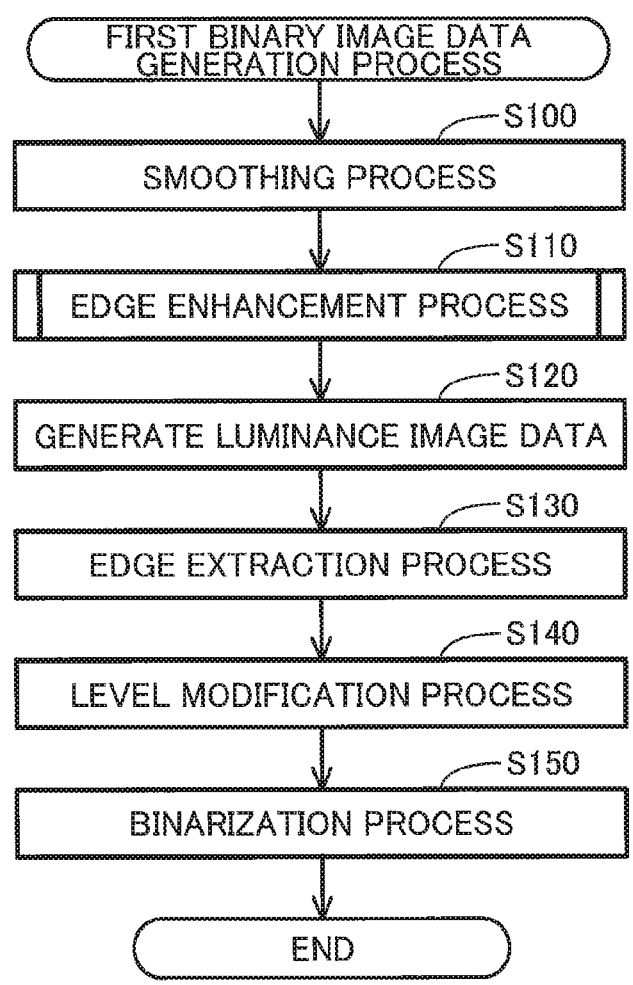
FIG. 5 is a flowchart illustrating steps in a first binary image data generation process.

The first binary image data generation process executed in S22 of FIG. 2 will be described. FIG. 5 is a flowchart illustrating steps in the first binary image data generation process. In S100 the CPU 210 executes a smoothing process on three sets of component image data included in the target image data, that is, R-component image data, G-component image data, and B-component image data. Hence, the CPU 210 generates three sets of smoothed component image data, that is, smoothed R-component image data, smoothed G-component image data, and smoothed B-component image data.

The smoothing process performed on the component image data to be processed (hereinafter called processing component image data) is a process to smooth a component image represented by the processing component image data. In the smoothing process of the present embodiment, the CPU 210 applies a predetermined smoothing filter to the values of pixels constituting the processing component image data to calculate smoothed values of the pixels constituting smoothed component image data. For example, a Gaussian filter having a size of seven pixels vertically by seven pixels horizontally is used as the smoothing filter.

In S110 the CPU 210 executes an edge enhancement process on the three sets of smoothed component image data to generate three sets of edge-enhanced component image data, that is, edge-enhanced R-component image data, edge-enhanced G-component image data, and edge-enhanced B-component image data.

Figure 6:
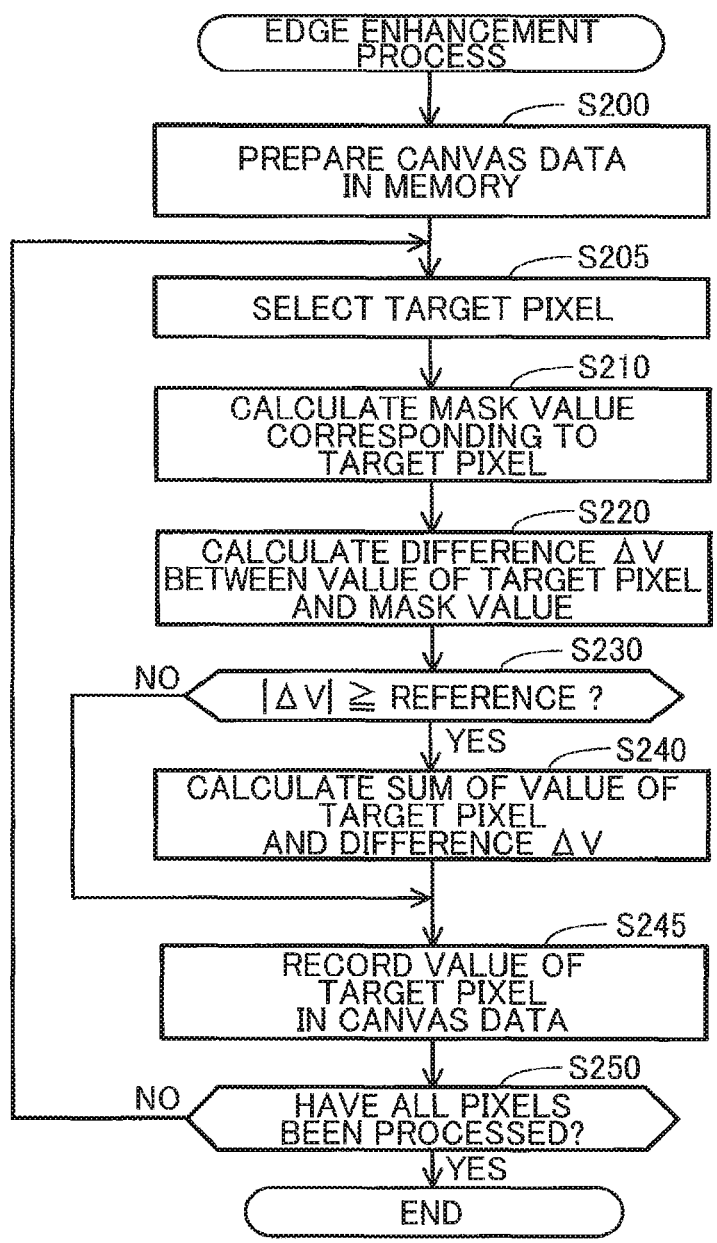
FIG. 6 is a flowchart illustrating steps in an edge enhancement process.

FIG. 6 is a flowchart illustrating steps in the edge enhancement process. It is assumed here that the smoothed R-component image data is the processing data. The same process is executed also on the smoothed G-component image data and smoothed B-component image data.

In S200 the CPU 210 prepares canvas data in a memory (and specifically in the buffer area of the volatile storage device 220) for generating the edge-enhanced R-component image data. A canvas represented by the canvas data (an initial image) is an image having the same size as the scanned image SI, i.e., having the same number of pixels. The value for each pixel in the canvas data is set to a prescribed initial value ("0," for example).

In S205 the CPU 210 selects a target pixel from among a plurality of pixels in a smoothed R-component image represented by the smoothed R-component image data.

In S210 the CPU 210 calculates a mask value MV corresponding to the selected target pixel. The mask value MV is calculated by executing a smoothing process to smooth a value TV of the target pixel using the value TV of the target pixel and the values of a predetermined number of peripheral pixels including four pixels adjacent to the left, right, top, and bottom of the target pixel. Thus, the mask value MV is also called a smoothed value. Specifically, the mask value MV corresponding to the target pixel is calculated as the average of values of one-hundred pixels within a rectangle range that is centered on the target pixel and that has a size of ten pixels vertically by ten pixels horizontally.

In S220 the CPU 210 calculates a difference $\Delta V$ between the value TV of the target pixel and the mask value MV corresponding to the target pixel ($\Delta V = TV - MV$).

In S230 the CPU 210 determines whether the absolute value of the difference $\Delta V$ is greater than or equal to a reference. Specifically, the CPU 210 determines whether the absolute value of the difference $\Delta V$ is greater than or equal to a predetermined threshold value TH. When the component value takes 256 gradation values ranging from 0 to 255, the threshold value TH is, for example, a value of about 20 to 30.

When the absolute value of the difference $\Delta V$ is greater than or equal to the reference (S230: YES), in S240 the CPU 210 calculates the sum (TV+$\Delta V$) of the value TV of the target pixel and the difference $\Delta V$ corresponding to the target pixel as a processed value. When the absolute value of the difference $\Delta V$ is smaller than the reference (S230: NO), the CPU 210 skips the step S240.

In S245, the CPU 210 records the value of the target pixel in the canvas data prepared in S200. When the step S240 is executed, the sum of the value TV of the target pixel and the difference $\Delta V$ corresponding to the target pixel calculated as the processed value in S240 is recoded in the canvas data. On the other hand, when the step S240 is skipped, the value TV of the target pixel in the smoothed R-component image data is recorded in the canvas data as is.

In S250 the CPU 210 determines whether all pixels in the smoothed R-component image have been processed as target pixels. When there remain unprocessed pixels (S250: NO), the CPU 210 returns to S205 and selects one of the unprocessed pixels to be the target pixel. When all pixels have been processed (S250: YES), the CPU 210 ends the edge enhancement process. At this point, the edge-enhanced R-component image data has been generated.

Figure 7A:
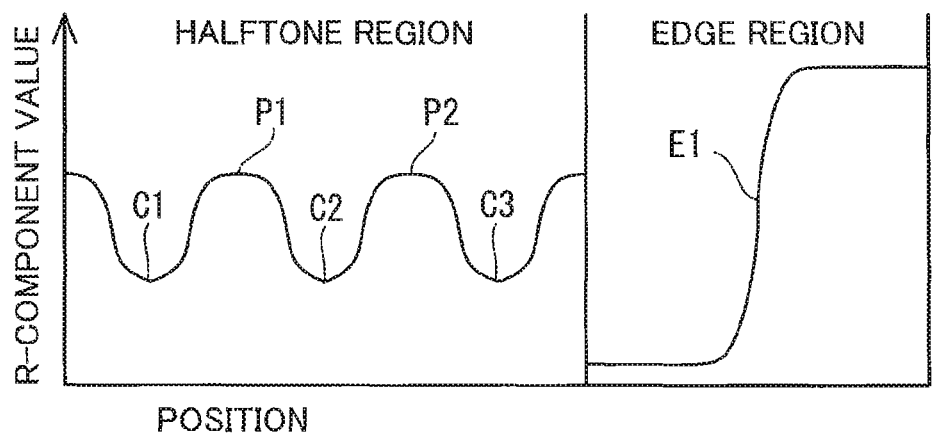
Figure 7B:
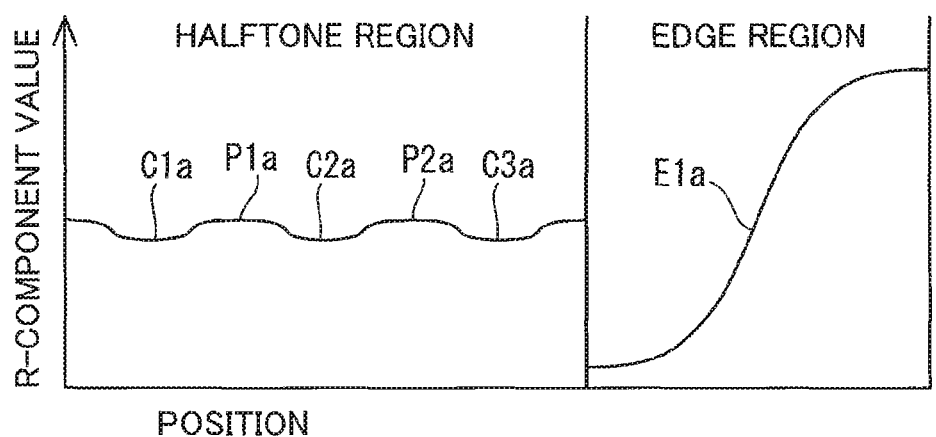
Figure 7C:
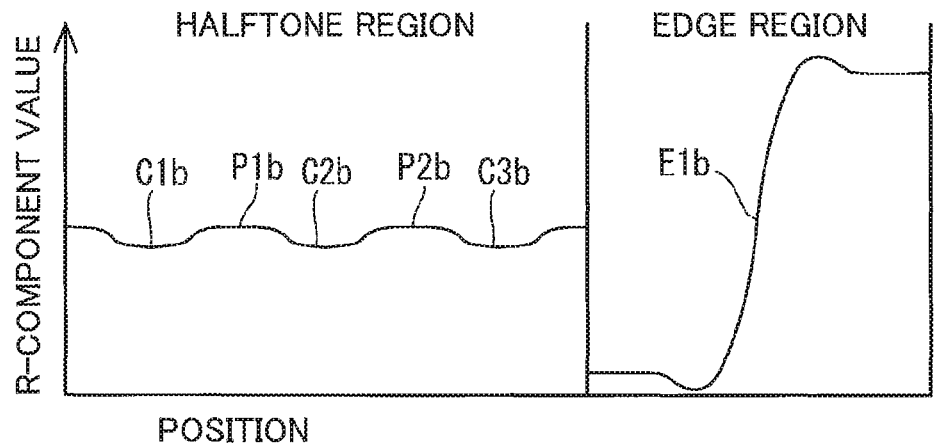

FIGS. 7A to 7C are explanatory diagrams illustrating R-component image data, smoothed R-component image data, and edge-enhanced R-component image data. FIG. 7A is a graph conceptually illustrating the R-component image data prior to undergoing the smoothing process in S100 of FIG. 5. FIG. 7B is a graph conceptually illustrating the R-component image data that has undergone the smoothing process, while FIG. 7C is a graph conceptually illustrating the R-component image data that has undergone the edge enhancement process in S110 of FIG. 5. The left portion of each graph conceptually illustrates a halftone region showing part of a halftone, while the right portion conceptually illustrates an edge region showing part of the edge of an object such as a character. The vertical axis of each graph indicates the R-component value, while the horizontal axis indicates the position relative to a prescribed direction (the first direction D1 illustrated in FIGS. 3A to 3D, for example).

As illustrated in FIG. 7A, the R-component image data prior to undergoing the smoothing process includes a plurality of troughs C1 to C3 and a plurality of crests P1 and P2 corresponding to a plurality of halftone dots in the halftone region and a plurality of gaps between the halftone dots, for example. When there remains a large difference in the R-component value between the troughs C1 to C3 and the crests P1 and P2 as in FIG. 7A, edge pixels representing halftone dots are likely to be identified in the binarization process of S150 described later owing to this difference in R-component values. The halftone region includes halftone dots when viewed at the pixel level (from a microscopic viewpoint sufficient to recognize halftone dots), but is a uniform region to an ordinary observer (from a macroscopic viewpoint insufficient to recognize halftone dots). Hence, edge pixels originating from halftone dots in a halftone region should not be identified in the present embodiment because halftone regions are preferably smoothed in S30 of FIG. 2 and should not be sharpened in S40 of FIG. 2. If edges of a halftone were sharpened, the periodic repetition of the halftone would become more noticeable, resulting in noticeable moiré patterns in the printed image. Thus, edge pixels in the scanned image SI should not be identified in uniform parts of objects, such as photos.

In the smoothed R-component image data illustrated in FIG. 7B, the difference in R-component values between a plurality of troughs C1a to C3a and a plurality of crests P1a and P2a in the halftone region, for example, have been sufficiently reduced through the smoothing process in comparison to the R-component image data prior to the smoothing process illustrated in FIG. 7A.

Here, the effects of edge enhancement in the edge enhancement process of the present embodiment are greater when using a larger difference ΔV between the value TV of the target pixel and the mask value MV corresponding to the target pixel. Accordingly, the effects of edge enhancement are less in flatter regions whose differences in R-component values are relatively small, as in the halftone region of FIG. 7B. Further, if the difference ΔV for a pixel is less than the reference in the edge enhancement process of the present embodiment, the value of the pixel in the smoothed R-component image data is used as is, without being subjected to edge enhancement (S230 of FIG. 6). Thus, in the edge-enhanced R-component image data illustrated in FIG. 7C, the difference in R-component values between a plurality of troughs C1b to C3b and a plurality of crests P1b and P2b in the halftone region is not any greater than the smoothed R-component image data, despite undergoing the edge enhancement process. In other words, as with the smoothed R-component image data (FIG. 7B), the difference in R-component values between the troughs C1b to C3b and the crests P1b and P2b in the edge-enhanced R-component image data (FIG. 7C) is sufficiently smaller than that in the R-component image data prior to the smoothing process (FIG. 7A).

In the unsmoothed R-component image data illustrated in FIG. 7A, a variation part E1 appears in an edge region indicating the edge of a character or other object, for example. The variation part E1 is a part corresponding to an edge in which the R-component value varies sharply. The greater the change in value in the variation part E1, the easier to identify edge pixels representing the edge of an object in the binarization process of S150 described later owing to the difference in R-component values.

In the smoothed R-component image data illustrated in FIG. 7B, the values in a variation part E1a of an edge region have been smoothed in the smoothing process so that the change in value is smaller (gentler) than in the R-component image data prior to the smoothing process (FIG. 7A).

However, since the change in values in the variation part E1a corresponding to an edge of a character or other object is sufficiently greater than the change in values in the halftone region, this change is returned to a sharp change in the edge enhancement process. As a result, the edge-enhanced R-component image data illustrated in FIG. 7C has a variation part E1b in the edge region in which the change in R-component values is greater than that in the smoothed R-component image data illustrated in FIG. 7B. Hence, the change in values in the variation part E1b in the edge-enhanced R-component image data (FIG. 7C) is approximately the same or sharper than in the R-component image data prior to smoothing (FIG. 7A).

As described above, by executing the smoothing process (S100) and the edge enhancement process (S110) in sequence on each set of component image data in the present embodiment, it is possible to suppress the identification of edge pixels specifying edges in a halftone and to facilitate the identification of edge pixels specifying edges of a character or other object. As a result, the CPU 210 can suitably identify a plurality of edge pixels in the scanned image SI.

After three sets of edge-enhanced component image data corresponding to three color components of R, G, and B are generated, in S120 of FIG. 5, the CPU 210 generates luminance image data using the three sets of edge-enhanced component image data. The luminance image data represents a luminance of each pixel in an edge-enhanced image represented by the three sets of edge-enhanced component image data. Specifically, the CPU 210 uses the R value, G value, and B value of each pixel acquired from the three sets of edge-enhanced component image data to calculate a luminance Y of each pixel. The luminance Y is the weighted average of the three component values and can be calculated using the following expression: $Y=0.299\times R+0.587\times G+0.114\times B$. The luminance image data is single-component image data including one type of component value (a value representing the luminance). The luminance image data includes the luminance of each pixel based on the value (RGB values) of the corresponding pixel in the scan data.

In S130 the CPU 210 executes an edge extraction process on the generated luminance image data. The edge extraction process performed on the luminance image data extracts edges in a luminance image represented by the luminance image data. The CPU 210 thereby generates edge data. Specifically, the CPU 210 applies an edge extraction filter well known in the art, such as a Sobel filter, to the values of the pixels constituting the luminance image data to thereby calculate a plurality of edge strengths respectively corresponding to the pixels. The CPU 210 generates the edge data including the plurality of edge strengths as a plurality of values of pixels.

In S140 the CPU 210 executes a level modification process on the edge data to generate modified edge data. The level modification process is a modification process to extend a specific range within the range of the gradation values that the values of the pixels constituting the edge data can take (in the present embodiment, values ranging from 0 to 255).

Figure 8:
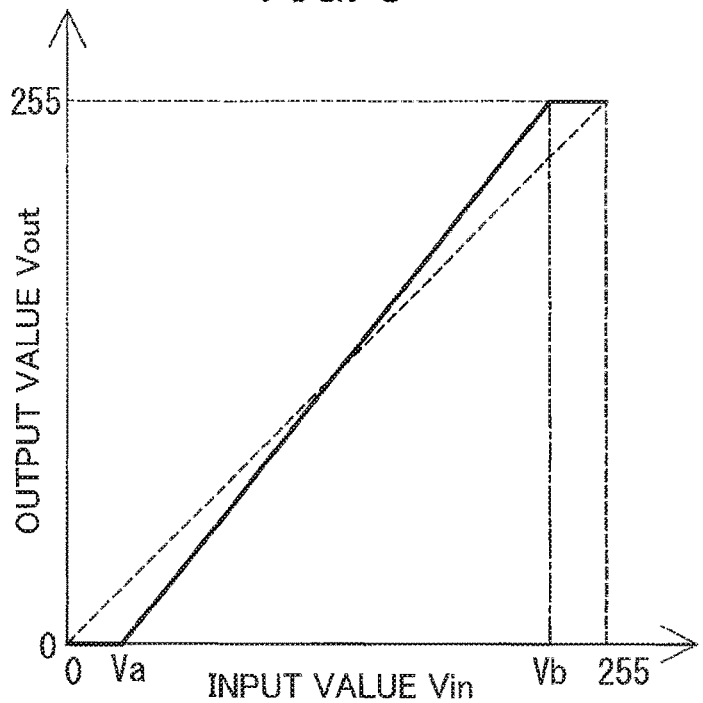
FIG. 8 illustrates an example of a tone curve for use in a level modification process.

FIG. 8 illustrates an example of a tone curve for use in the level modification process. Specifically, the CPU 210 applies the tone curve illustrated in FIG. 8 to the values of the pixels constituting the edge data. More specifically, each of the values of the pixels is taken as an input value Vin, and an output value Vout corresponding to the input value Vin on the tone curve is taken as a converted value. As a result, values equal to or greater than a threshold Vb (for example, 245) are all converted into the maximum value (255), and values equal to or smaller than a threshold Va (for example, 10) are all converted into the minimum value (0). Thus, the range of values greater than the threshold Va and smaller than the threshold Vb is extended to the range from 0 to 255. In this way, the range including a binarization threshold (the range of values greater than the threshold Va and smaller than the threshold Vb illustrated in FIG. 8) is extended prior to the binarization process in S150 described later, thereby improving the accuracy of binarization.

In S150 the CPU 210 executes a binarization process on the modified edge data to generate binary image data. For example, in the modified edge data, the CPU 210 classifies the pixels having a value (i.e., edge strength) equal to or greater than a threshold (for example, 128) into edge pixels, and classifies the pixels having a value smaller than the threshold into non-edge pixels. As described above, in the binary image data, the values of the edge pixel and non-edge pixel are set to "1" and "0", respectively.

According to the first binary image data generation process described above, the smoothing process is executed on each of the plurality of sets of component image data to allow the appearance of features of halftone dots in the scanned image SI to be reduced, as described with reference to FIGS. 7A and 7B. Further, the edge enhancement process is executed on each of the plurality of sets of smoothed component image data to allow the edges in the smoothed scanned image SI that has undergone the smoothing process to be appropriately enhanced, as described with reference to FIGS. 7B and 7C. As a result, edge pixels in the scanned image SI can be appropriately identified while suppressing pixels originating from halftone dots from being incorrectly identified as edge pixels.

Further, since the luminance image data is used as the single-component image data, the plurality of edge pixels in the scanned image SI can be identified more appropriately. For example, the halftone dots each often has a primary color of any of C, M, and Y used for printing, and differences among the plurality of primary colors are comparatively greater in each of the R-, G-, and B-component image data but are comparatively less in the luminance image data. Thus, usage of the luminance image data allows the identification of edge pixels originating from halftone dots to be appropriately suppressed. Further, a comparatively great difference in luminance is often given between the color of characters and color of background for good legibility. Thus, usage of the luminance image data allows the edge pixels constituting the edges of objects including characters to be appropriately identified.

In addition, a so-called unsharp mask process including calculation of the mask value MV (also called smoothed value) corresponding to the target pixel (S210); calculation of the difference ΔV between the value TV of the target pixel and the mask value MV corresponding to the target pixel (S220); and calculation of the sum (TV+ΔV) of the value TV of the target pixel and the difference ΔV corresponding to the target pixel (S240) is performed in the edge enhancement process of FIG. 6. This allows the edges in the scanned image SI to be appropriately enhanced, so that omission in identifications for pixels to be identified as edge pixels can be reduced. As a result, the edge pixels in the scanned image SI can be identified more appropriately.

Further, in the edge enhancement process of FIG. 6, among the plurality of pixels in the scanned image SI, each of the pixels whose corresponding difference ΔV is equal to or greater than the reference is to be subjected to the unsharp masking process, whereas each of the pixels whose corresponding difference ΔV is less than the reference is not to be subjected to the unsharp masking process (S230 and S240). As a result, as described with reference to FIGS. 7B and 7C, the difference in the values of the pixels caused by the halftone dots in the scanned image SI can be further suppressed from being enhanced. Therefore, the identifications of edge pixels originating from halftone dots can be further suppressed. Further, the edges of objects such as a character and the like can be adequately enhanced. Thus, the edge pixels in the scanned image SI can be identified more appropriately.

A-5: Second Binary Image Data Generation Process

Figure 9:
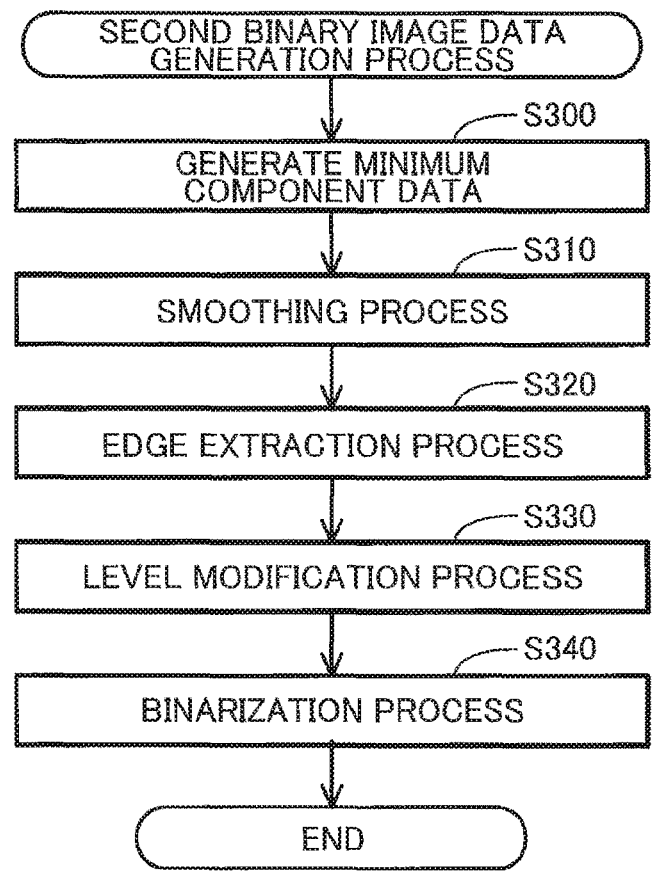
FIG. 9 is a flowchart illustrating steps in a second binary image data generation process.
Figure 10A:
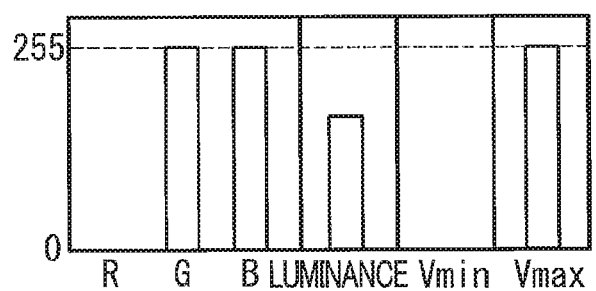
FIG. 10A is an explanatory view illustrating RGB values, a luminance, a minimum component value, and a maximum component value of cyan in the scan data by bar graphs.
Figure 10B:
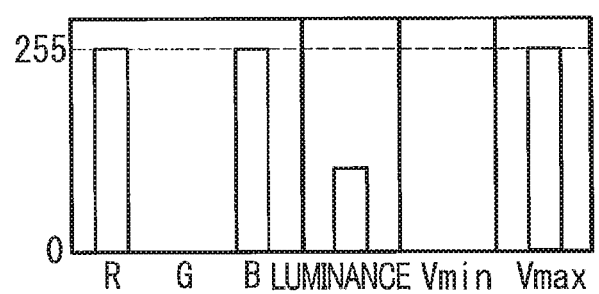
FIG. 10B is an explanatory view illustrating RGB values, a luminance, a minimum component value, and a maximum component value of magenta in the scan data by bar graphs.
Figure 10C:
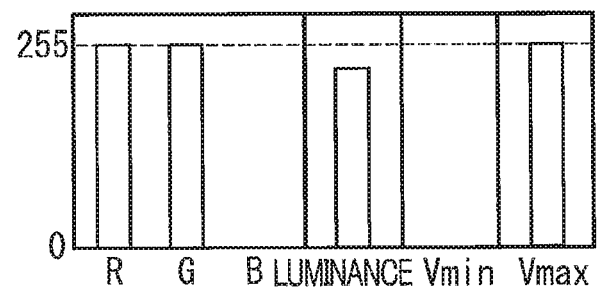
FIG. 10C is an explanatory view illustrating RGB values, a luminance, a minimum component value, and a maximum component value of yellow in the scan data by bar graphs.
Figure 10D:
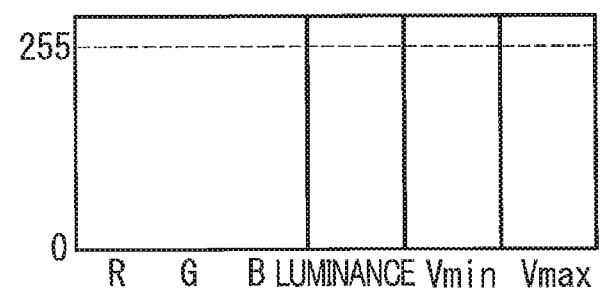
FIG. 10D is an explanatory view illustrating RGB values, a luminance, a minimum component value, and a maximum component value of black in the scan data by bar graphs.
Figure 10E:
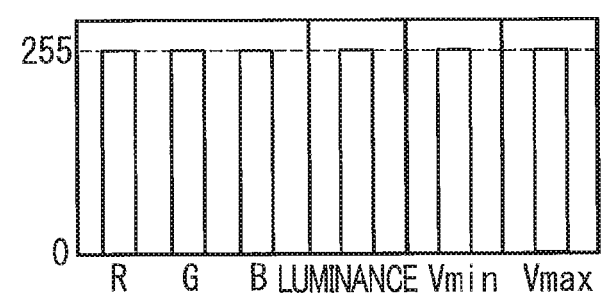
FIG. 10E is an explanatory view illustrating RGB values, a luminance, a minimum component value, and a maximum component value of white in the scan data by bar graphs.

The second binary image data generation process executed in S24 of FIG. 2 will be described. FIG. 9 is a flowchart illustrating steps in the second binary image data generation process. In S300 the CPU 210 generates minimum component data using the scan data. Specifically, the CPU 210 acquires a minimum component value Vmin from each of the values of the plurality of pixels (RGB value) included in the scan data. Each minimum component value Vmin is the minimum value among a plurality of component values (R value, G value, and B value) of the corresponding pixel. The CPU 210 generates, as the minimum component data, image data including a plurality of minimum component values Vmin as the values of the plurality of pixels. The minimum component data is image data representing an image having the same size as that of the scanned image SI. Each of the values of the plurality of pixels included in the minimum component data is the minimum component value Vmin among the component values of the corresponding pixel (RGB value) included in the scan data.

FIGS. 10A to 10E are explanatory diagrams of minimum and maximum component values in the scan data. FIGS. 10A to 10E illustrate the RGB values of respective cyan (C), magenta (M), yellow (Y), black (K), and white (W) by bar graphs. As illustrated in FIGS. 10A to 10E, the RGB values (denoted by R, G, and B in FIGS. 10A to 10E) of the respective C, M, Y, K, and W are (0, 255, 255), (255, 0, 255), (255, 255, 0), (0, 0, 0), and (255, 255, 255).

As described above, the luminance Y of each of the RGB values of respective C, M, Y, K, and W can be calculated using the following expression: $Y=0.299 \times R + 0.587 \times G + 0.114 \times B$, for example. The luminances Y (represented by values ranging from 0 to 255) of the respective C, M, Y, K, and W are 186, 113, 226, 0, 255, approximately, which are mutually different values (FIGS. 10A to 10E). On the other hand, the minimum component values Vmin of the respective C, M, Y, K, and W are 0, 0, 0, 0, and 255 as illustrated in FIGS. 10A to 10E. That is, the minimum component values Vmin are the same value except for that of white (W).

Figure 11A:
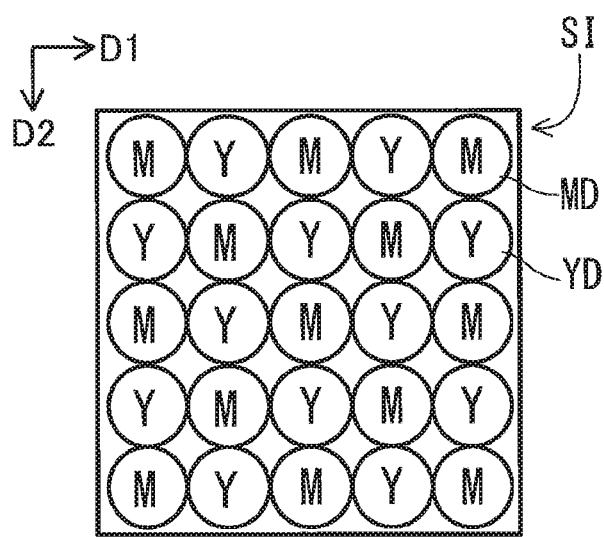
Figure 11B:
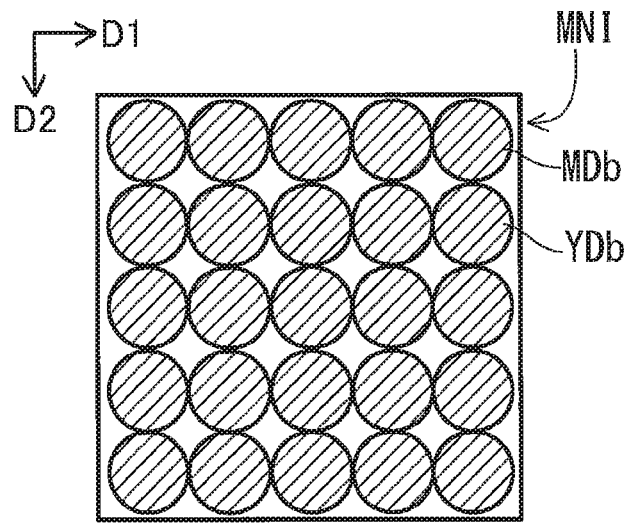
Figure 11C:
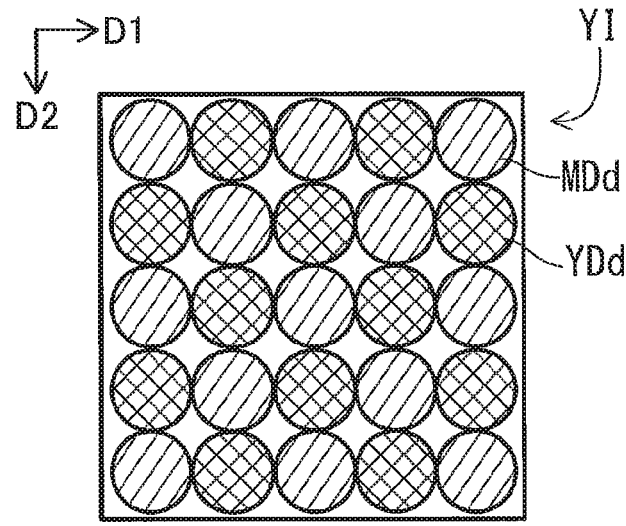

FIGS. 11A to 11C are second views illustrating an example of images used in the image process. FIG. 11A is an enlarged view of the above-described halftone region which is extracted from the scanned image SI. In the example of FIG. 11A, for example, the halftone region in the scanned image SI includes a plurality of M dots MD and a plurality of Y dots YD. Here, for the purpose of illustration, it is assumed that an image representing the M dot MD is a uniform image having the primary color of magenta and that an image representing the Y dot YD is a uniform image having the primary color of yellow.

FIG. 11B illustrates an example of a minimum component image MNI represented by the minimum component data. The minimum component image MNI corresponds to the scanned image SI of FIG. 11A. In the minimum component image MNI, a value of a pixel in an area MDb corresponding to the M dot MD in the scanned image SI is the same as a value of a pixel in an area YDb corresponding to the Y dot YD. FIG. 11C illustrates, as a comparative example, a luminance image YI represented by luminance image data indicative of the luminance of each of the pixels. The luminance image YI corresponds to the scanned image SI of FIG. 11A. Unlike in the case of the minimum component image MNI of FIG. 11B, in the luminance image YI, a value of a pixel in an area MDd corresponding to the M dot MD in the scan image SI is different from a value of a pixel in an area YDd corresponding to the Y dot YD.

As can be seen from the above description, the differences in the values for the plurality of pixels in the scanned image SI that correspond to regions in the original in which C, M, Y, and K dots are formed are smaller in the minimum component image MNI than those in the luminance image YI. Further, in the minimum component image MNI, the values of pixels in base color regions corresponding to regions indicating the base color of the original (the white color of the paper) are greater than the values for pixels in the scanned image SI that correspond to regions in the original in which dots are formed.

In S310 the CPU 210 executes a smoothing process on the generated minimum component data. The smoothing process performed on the minimum component data smooths the minimum component image MNI represented by the minimum component data. The CPU 210 thereby generates smoothed minimum component data. Specifically, the CPU 210 applies a prescribed smoothing filter to the values of pixels constituting the minimum component data to calculate smoothed values of pixels. In the present embodiment, a Gaussian filter having a size of five pixels vertically by five pixels horizontally is used as the smoothing filter. The smoothed minimum component data includes, as the value of each pixel, the smoothed value of the pixel generated by executing the above process on the value of the corresponding pixel included in the scan data.

In S320 the CPU 210 executes an edge extraction process on the smoothed minimum component data. The edge extraction process performed on the smoothed minimum component data extracts edges in the smoothed minimum component image MNI represented by the smoothed minimum component data. The CPU 210 thereby generates edge data. Specifically, the CPU 210 applies the same Sobel filter as that used in S130 of FIG. 5 to the values of the pixels constituting the smoothed minimum component data to calculate a plurality of edge strengths. The CPU 210 generates the edge data including the plurality of edge strengths as the plurality of pixel values.

In S330 the CPU 210 executes a level modification process on the edge data to generate modified edge data. The level modification process is the same process as that executed in S140 of FIG. 5. In S340 the CPU 210 executes the same process as the binarization process executed in S150 of FIG. 5 on the modified edge data to generate binary image data. As described above, in the binary image data, the values of the edge pixel and non-edge pixel are set to "1" and "0", respectively.

According to the second binary image data generation process described above, the edge extraction process is executed on the minimum component data to generate the edge data (S320 of FIG. 9). Then, the plurality of edge pixels in the scanned image SI is identified (S330 and S340 of FIG. 9, and S26 of FIG. 2) by executing the edge pixel identification process including the process to binarize the edge data (S340 of FIG. 9). In the minimum component data, as described with reference to FIGS. 11A to 11C, the difference in the values of the pixels can be suppressed in the halftone region. As a result, identification of edge pixels originating from halftone dots can be suppressed when identifying edge pixels. Thus, edge pixels in the scanned image SI can be appropriately identified.

More specifically, five types of elements, C, M, Y, and K dots and base color (white) of the paper, constitute the halftone region. In the minimum component data, out of these five types of elements, the differences among the values of pixels representing four types of elements can be suppressed. As a result, usage of the minimum component data can suppress the identification of edge pixels specifying edges in a halftone.

It is often the case that when a character is present in an image, the character has a dark color and its background has a light color, or vice versa. Accordingly, one of the character and background may include a relatively large amount of portions representing the base color (white) of the paper, and the other one thereof may include a relatively large amount of portions representing any of C, M, Y, and K dots. As illustrated in FIGS. 10A to 10E, in the minimum component data, large differences exist between the values of the pixels in a portion representing any of C, M, Y, and K dots and the values of the pixels in a portion representing the base color (white) of the paper. Thus, it is more likely that when edge pixels are identified using the minimum component data, the edge pixels constituting the edges of characters can be appropriately identified. Particularly, yellow (Y) is lower in density (higher in luminance) than cyan (C), magenta (M), and black (K). Thus, in a case where a character having a yellow color is present on a background having the base color (white) of the paper, the edge pixels constituting the edges of the yellow character may not be appropriately identified even if the luminance image data is binarized. In the present embodiment, the edge pixels constituting the yellow character can be appropriately identified even in such a case. Thus, by identifying the edge pixels using not only the luminance image data but also the minimum component data, edge pixels of a character and the like that cannot be identified using only the luminance image data can be identified. As a result, the accuracy of identifications of the edge pixels in the scanned image SI can be improved.

Further, the smoothing process is executed on the minimum component data prior to undergoing the edge extraction process (S310 of FIG. 9). As a result, the difference in the values of the pixels in the halftone region of the minimum component image MNI can be further suppressed by executing the smoothing process. For example, a portion representing the dot in the halftone region of the scanned image SI does not always have the primary color of C, M, Y, or K due to overlap or blurring of the dots of C, M, Y, and K at the time of reading by the scan execution unit 290. Therefore, in the minimum component image MNI, the differences among values of a plurality of pixels representing C, M, Y, and K dots are small but not zero. Execution of the smoothing process allows the above-described differences among the value of the pixels to be further reduced. As a result, edge pixels originating from halftone dots can be further suppressed from being identified. In addition, as with the first binary image data generation process, the level modification process is also executed in the second binary image data process (S330 of FIG. 9). As a result, the accuracy of identifications of the edge pixels in the scanned image SI can be improved.

As described above, in the first embodiment described above, two sets of single-component image data, i.e., the luminance image data and minimum component data are used to finally identify the edge pixels (S22 to S26 of FIG. 2). Since the two sets of single-component image data generated by mutually different processes are used to identify the plurality of edge pixels in the scanned image SI, omission in identifications for a plurality of edge pixels in the scanned image SI can be suppressed.

For example, when a yellow character is present on a white background, it is difficult to identify the edge pixels constituting the edge of this character by using the luminance image data since the difference in luminance between the white and yellow is relatively small. On the other hand, as can be seen from FIGS. 10C and 10E, the difference between the white and yellow is large in the minimum component data. Thus, the edge pixels constituting the edge of the yellow character on the white background can be easily identified by using the minimum component data.

Further, for example, when a yellow character is present on a magenta background, it is difficult to identify the edge pixels constituting the edge of this character by using the minimum component data since the difference does not appear between the magenta and yellow in the minimum component data. On the other hand, the difference in luminance between the magenta and yellow is relatively large. Thus, the edge pixels constituting the edge of the yellow character on the magenta background can be easily identified by using the luminance image data.

Further, in addition to the luminance image data, the minimum component data is used as the single-component image data. Accordingly, edge pixels originating from halftone dots in the scanned image SI can be suppressed from being identified, as described above.

A-6: Non-character Region Determination Process

Figure 12:
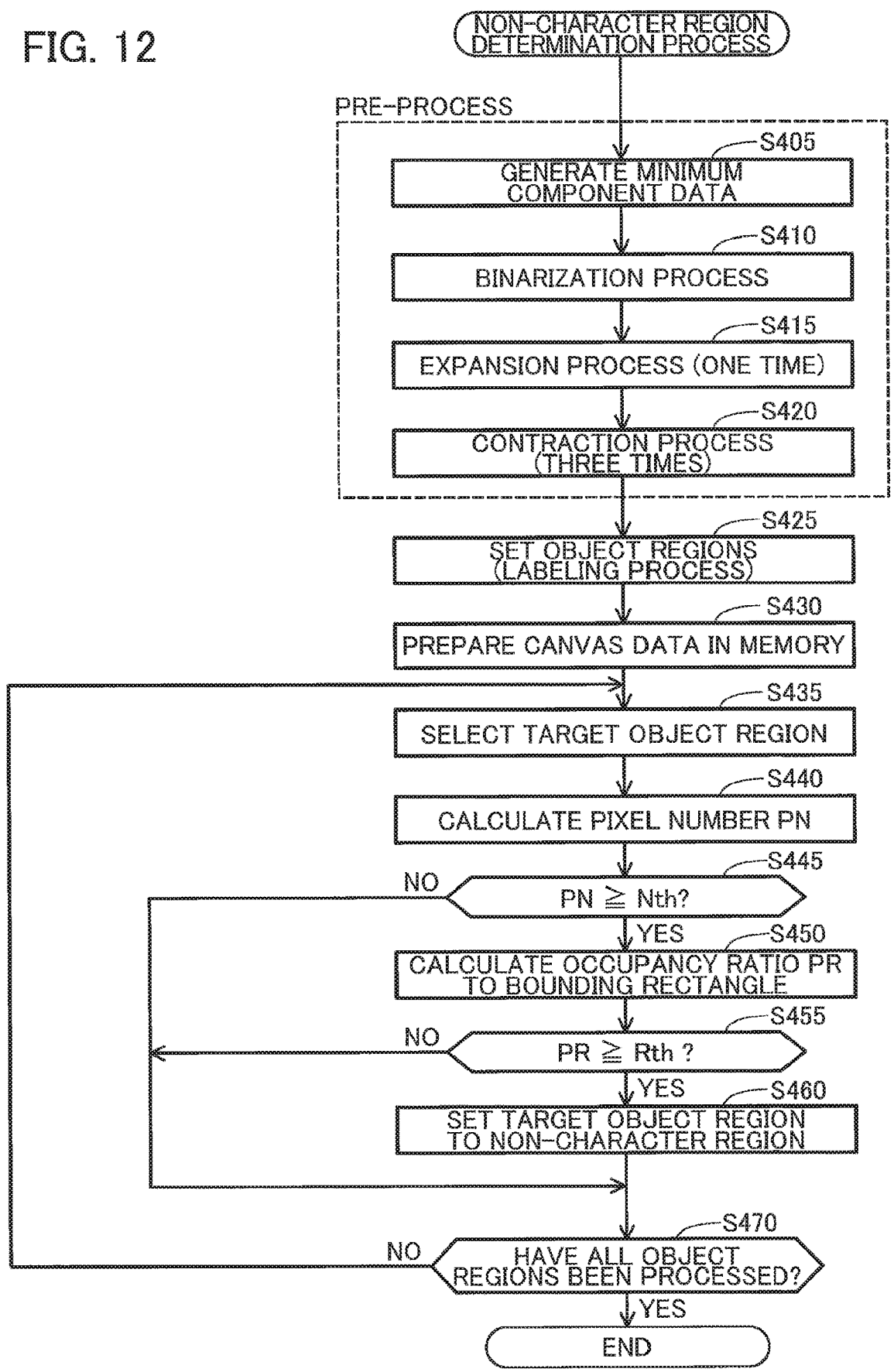
FIG. 12 is a flowchart illustrating steps in a non-character region determination process executed by the multifunction peripheral according to the first embodiment.
Figure 13A:
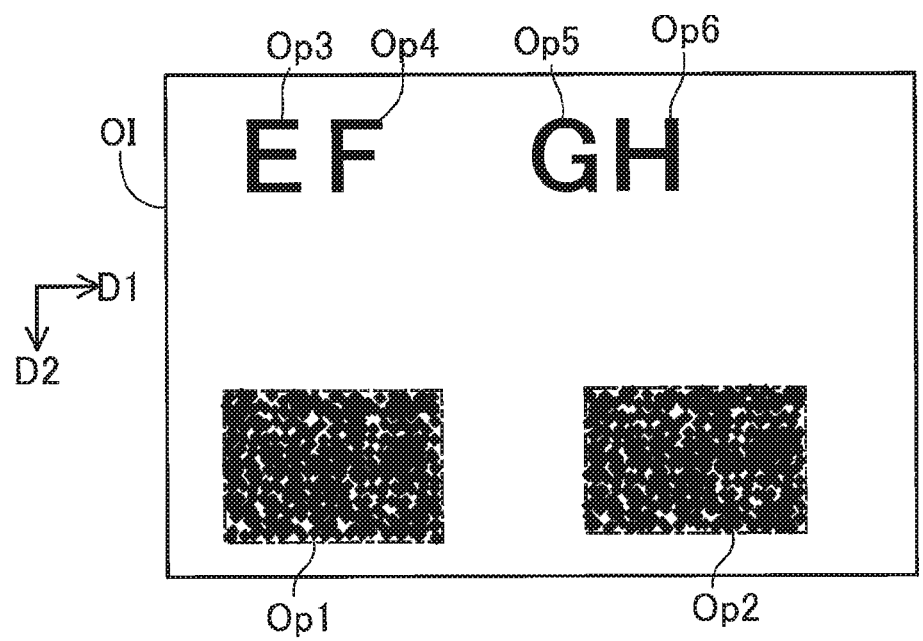
Figure 13B:
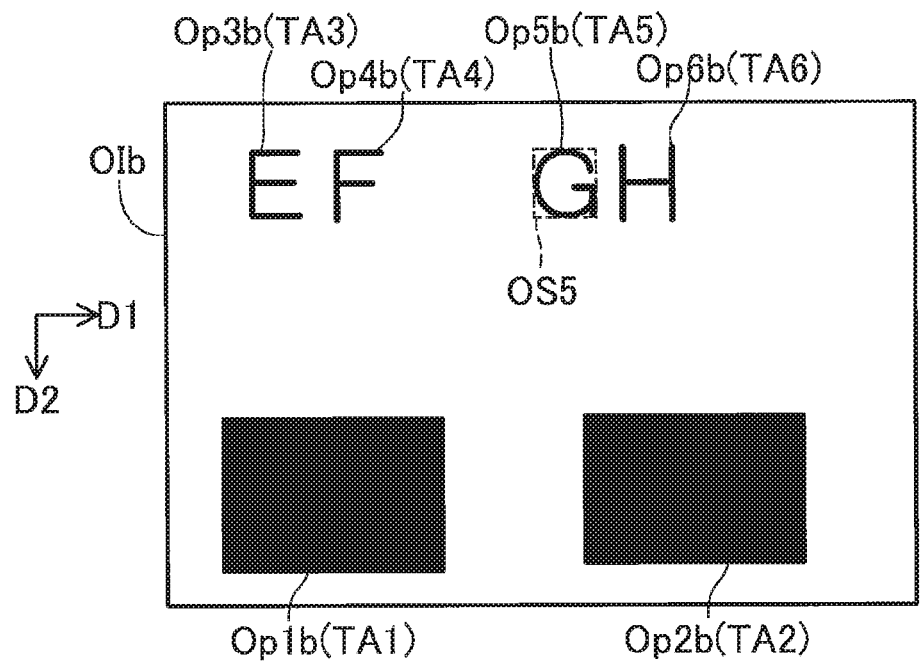

Next, the non-character region determination process of S28 in FIG. 2 will be described. FIG. 12 is a flowchart illustrating steps in the non-character region determination process. FIGS. 13A and 13B illustrate an example of images used in the non-character region identification process.

The CPU 210 executes a pre-process in S405 to S420 on scan data to generate pre-processed image data.

Specifically, in S405 the CPU 210 generates minimum component data from the scan data, as described in S300 of FIG. 9. The minimum component data generated in S300 of FIG. 9 may be used here as the minimum component data if the data has been saved in the volatile storage device 220 or non-volatile storage device 230.

In S410 the CPU 210 generates binary image data by binarizing the minimum component data. For example, the CPU 210 classifies pixels in the minimum component data whose values are greater than or equal to a threshold (128, for example) as specific object pixels and classifies pixels whose values are less than the threshold as non-specific object pixels. In the binary image data, the values of specific object pixels are set to "1", while the values of non-specific object pixels are set to "0", for example. As described above with reference to FIGS. 10A to 10E and FIGS. 11A to 11C, values for pixels in the minimum component data that correspond to regions in the original in which C, M, Y, and K dots are formed are smaller than the values of pixels in base color regions corresponding to regions indicating the base color of the original (the white color of the paper). Therefore, in generating the binary image data in this step, pixels corresponding to regions of the original in which dots are formed are classified as specific object pixels and pixels corresponding to base color regions are classified as non-specific object pixels. By binarizing the minimum component data in this way, it is possible to accurately identify object pixels constituting objects (images formed of dots) printed on the original.

The binary image data generated in this step will be called pre-expansion image data because the data has not yet undergone an expansion process of S415 described later. An image represented by this pre-expansion image data will be called a pre-expansion image OI. FIG. 13A illustrates an example of a pre-expansion image OI. Specific object pixels Op1 to Op6 corresponding to the objects Ob1 to Ob6 in the scanned image SI have been identified in the pre-expansion image OI. Since most characters in an original have relatively dark colors, the specific object pixels Op3 to Op6 identified in the pre-expansion image OI are generally continuous within regions corresponding to characters. Further, since dots are formed throughout each photo region of the original, the specific object pixels Op1 and Op2 are identified throughout each region corresponding to a photo.

However, since a photo may include both dark colors and light colors, non-specific object pixels (white portions in the pre-expansion image OI of FIG. 13A) are dispersed throughout the regions corresponding to photos in the pre-expansion image OI.

In S415 and S420 the CPU 210 executes an expansion process and a contraction process on the pre-expansion image data to generate the pre-processed image data. FIGS. 14A to 14C and FIGS. 15A to 15C illustrate the expansion process and contraction process.

Figure 14A:
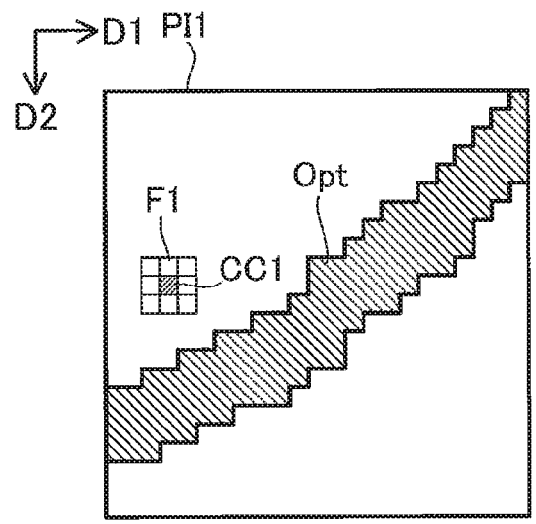
Figure 15A:
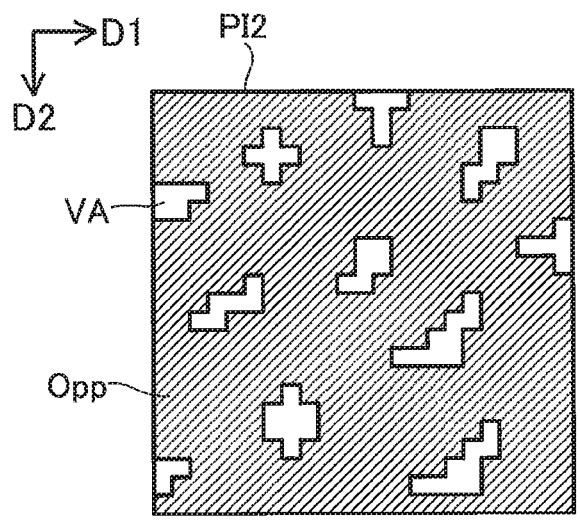

In S415 the CPU 210 executes a single expansion process on the pre-expansion image data. FIG. 14A illustrates a partial image PH of the pre-expansion image OI that includes a fine line corresponding to one of the character objects Ob3 to Ob6 in the scanned image SI. FIG. 15A illustrates a partial image PI2 of the pre-expansion image OI constituting a partial region corresponding to one of the photo objects Ob1 and Ob2 in the scanned image SI. The region with hatching in FIG. 14A indicates the specific object pixels Opt corresponding to the character. The region with hatching in FIG. 15A denotes the specific object pixels Opp corresponding to the photo.

The CPU 210 executes the expansion process using a filter of a prescribed size. In the example of FIG. 14A, the CPU 210 uses a filter F1 having a size of three pixels vertically by three pixels horizontally. Specifically, the CPU 210 generates expanded binary image data by applying the filter F1 to the pre-expansion image data. That is, the CPU 210 arranges the filter F1 over the pre-expansion image OI so that a center position CC1 (see FIG. 14A) of the filter F1 overlaps the target pixel. If even one specific object pixel is present within the range of the filter F1, the CPU 210 sets the pixel in the binary image represented by the binary image data being generated that corresponds to the target pixel to a specific object pixel. If no specific object pixels are present within the range of the filter F1, i.e., when all nine pixels falling in the range of the filter F1 are non-specific object pixels, the CPU 210 sets the pixel in the binary image represented by the binary image data being generated that corresponds to the target pixel to a non-specific object pixel. By sequentially selecting each pixel in the pre-expansion image OI to be the target pixel and setting the corresponding pixel in the binary image represented by the binary image data being generated to either a specific object pixel or a non-specific object pixel, the CPU 210 generates the expanded binary image data.

Figure 14B:
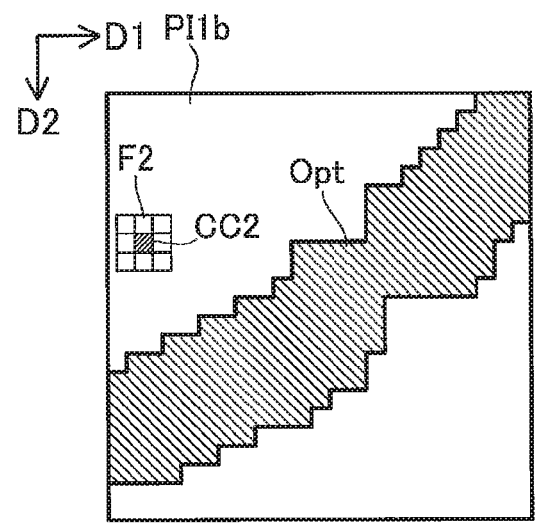
Figure 15B:
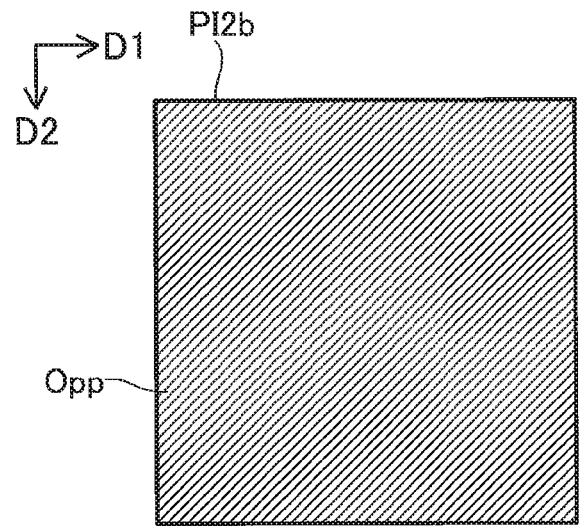

FIG. 14B illustrates an expanded partial image PI1*b* corresponding to the partial image PH in FIG. 14A. FIG. 15B illustrates an expanded partial image PI2*b* corresponding to the partial image PI2 in FIG. 15A. As illustrated in FIG. 14B, the line corresponding to the character that is represented by the specific object pixels Opt in the expanded binary image (the partial image PI1*b* in this example) is fatter than the line prior to the expansion process. As illustrated in FIG. 15B, non-specific object pixels VA (see FIG. 15A) dispersed in the region corresponding to a photo prior to the expansion process are modified to specific object pixels Opp in the expanded binary image (the partial image PI2*b* in this example) so that the entire region corresponding to the photo is configured of specific object pixels Opp.

In S420 the CPU 210 executes three contraction processes on the expanded binary image data.

The CPU 210 executes the contraction processes on the expanded binary image data using a filter of a prescribed size. In the example of FIG. 14B, the CPU 210 uses a filter F2 having a size of three pixels vertically by three pixels horizontally. Specifically, the CPU 210 applies the filter F2 to the expanded binary image data to generate contracted binary image data. That is, the CPU 210 places the filter F2 over the expanded binary image (the partial image PI1*b* and partial image PI2*b* in this example) so that a center position CC2 of the filter F2 (see FIG. 14B) overlaps the target pixel. When even a single non-specific object pixel is present in the range of the filter F2, the CPU 210 sets the pixel in the binary image represented by the binary image data being generated that corresponds to the target pixel to a non-specific object pixel. When no non-specific object pixels are present within the range of the filter F2, the CPU 210 sets the pixel in the binary image represented by the binary image data being generated that corresponds to the target pixel to a specific object pixel. By sequentially selecting each of the pixels in the expanded binary image to be the target pixel and setting the corresponding pixel in the binary image represented by the binary image data being generated to either a specific object pixel or a non-specific object pixel, the CPU 210 generates contracted binary image data.

Figure 14C:
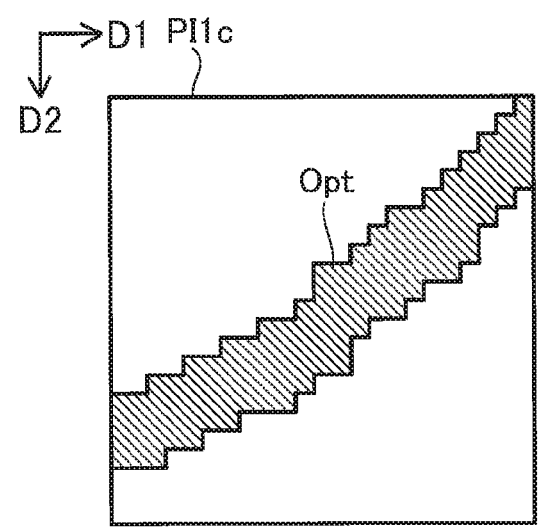
Figure 15C:
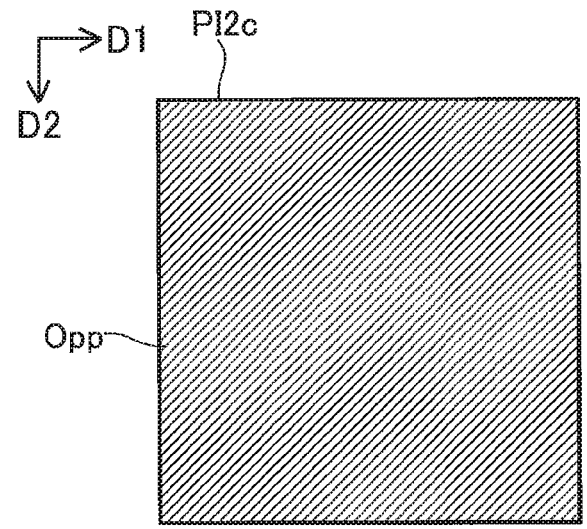

FIG. 14C illustrates a contracted partial image PI1*c* corresponding to the partial image PI1*b* in FIG. 14B. FIG. 15C illustrates a contracted partial image PI2*c* corresponding to the partial image PI2*b* in FIG. 15B. As illustrated in FIG. 14C, the line corresponding to a character and specified by specific object pixels Opt in the contracted binary image (the partial image PI1*c* in this example) is thinner than the same line prior to the contraction process. Further, since non-specific object pixels VA are no longer mixed in the region corresponding to the photo prior to the contraction process (see FIG. 15B), the entire region in the contracted binary image that corresponds to the photo remains configured of specific object pixels Opp (the partial image PI2*c* in this example), as illustrated in FIG. 15C.

The CPU 210 repeats the same contraction process on the binary image data produced in the first contraction process to generate binary image data that has undergone two contraction processes, and repeats the same contraction process on the binary image data produced from the second contraction process to generate binary image data that has undergone three contraction processes. The binary image data produced from the third contraction process serves as the pre-processed image data, and an image represented by the pre-processed image data will be called a pre-processed image OI*b*.

FIG. 13B illustrates an example of the pre-processed image OI*b*.

Specific object pixels Op1*b* to Op6*b* corresponding to the objects Ob1 to Ob6 in the scanned image SI have been identified in the pre-processed image OI*b*.

In the pre-processed image OI*b*, the lines represented by the specific object pixels Op3*b* to Op6*b* corresponding to characters are thinner than those in the pre-expansion image OI. The lines are thinner in the pre-processed image OI*b* because the degree of contraction in the contraction process is greater than the degree of expansion in the expansion process. Specifically, the number of contraction processes (three in the present embodiment) is greater than the number of expansions processes (one in the present embodiment). In some cases, part or all of the specific object pixels Op3 to Op6 corresponding to characters may disappear in the contraction processes when the lines represented by the specific object pixels Op3 to Op6 are relatively fine in the pre-expansion image OI. However, since it is only necessary to identify non-character regions in the non-character region determination process, the disappearance of the specific object pixels Op3 to Op6 corresponding to characters is not a problem.

In the pre-processed image OI*b*, the entirety of regions corresponding to photos is configured of specific object pixels Op1*b* and Op2*b*. This is because all pixels within the region corresponding to a photo are initially set to specific object pixels through the expansion process and subsequently are maintained as specific object pixels, even when the degree of contraction in the contraction processes is greater than the degree of expansion in the expansion process. Since the degree of contraction in the contraction processes is greater than the degree of expansion in the expansion process, the regions corresponding to photos in the pre-processed image OI*b* in which the pluralities of specific object pixels Op1*b* and Op2*b* are positioned are slightly smaller as a whole than the regions corresponding to the same photos in the pre-expansion image OI in which the pluralities of specific object pixels Op1 and Op2 are positioned, but this difference is not sufficient to cause problems.

In S425 the CPU 210 performs a labeling process on the pre-processed image data to set a plurality of object regions. Specifically, the CPU 210 treats a single region configured of one or more contiguous specific object pixels as one object region and assigns a single identifier to that object region. The CPU 210 assigns different identifiers to object regions that are separated from each other. Through this labeling process, a plurality of object regions is identified. In the example of FIG. 13B, the CPU 210 has set four object regions TA3 to TA6 that correspond to the four character objects Ob3 to Ob6 in the scanned image SI and two object regions TA1 and TA2 that correspond to the two photo objects Ob1 and Ob2 in the scanned image SI. Since the pixels in the scanned image SI have a one-on-one correspondence to the pixels in the pre-expansion image OI, setting an object region in the pre-expansion image OI is equivalent to setting an object region in the scanned image SI.

In S430 the CPU 210 prepares canvas data in a memory (and specifically in the buffer area of the volatile storage device 220) for generating non-character region data. A canvas represented by the canvas data (an initial image) is a binary image having the same size as the scanned image SI, i.e., having the same number of pixels. The value for each pixel in the canvas data is set to a prescribed initial value ("0," for example) indicating a pixel for a region different from a non-character region.

In S435 the CPU 210 selects one target object region from among the plurality of object regions set in the pre-processed image OI*b*.

In S440 the CPU 210 calculates a pixel number PN denoting the number of specific object pixels constituting the target object region. In S445 the CPU 210 determines whether the pixel number PN is greater than or equal to a threshold Nth. The threshold Nth is a value corresponding to the size of the original and the resolution of the scanned image SI and is predetermined empirically using scan data based on originals that include characters and photos. When the pixel number PN is greater than or equal to the threshold Nth (S445: YES), the CPU 210 advances to S450.

In S450 the CPU 210 calculates an occupancy ratio PR of the target object region to a bounding rectangle OS that circumscribes the target object region. For example, if the object region TA5 in FIG. 13B is the target object region, the CPU 210 calculates the occupancy ratio PR to be the ratio of the pixel number PN in the object region TA5 to a pixel number SN in a bounded rectangle OS5 designated by the dashed line (PR=PN/SN). In S455 the CPU 210 determines whether the occupancy ratio PR is greater than or equal to a threshold Rth. The threshold Rth is predetermined empirically using scan data based on an original that includes both characters and photos. For example, the threshold Rth is set to a value between 80% and 90%. If the occupancy ratio PR is greater than or equal to the threshold Rth (S455: YES), the CPU 210 advances to S460.

In S460 the CPU 210 sets the target object region to a non-character region. Specifically, the CPU 210 sets the values for all pixels in the canvas data that fall in the region corresponding to the target object region to the value "1" indicating a non-character.

On the other hand, when the pixel number PN is less than the threshold Nth (S445: NO) or when the occupancy ratio PR is less than the threshold Rth (S455: NO), the CPU 210 skips S460 and advances to S470. In other words, in this case the target object region is set to a region different from a non-character region. Therefore, the values of all pixels in the region corresponding to the target object region are maintained at the initial value "0" in the canvas data.

In S470 the CPU 210 determines whether all object regions in the pre-processed image OIb have been processed as target object regions. When there remain unprocessed object regions (S470: NO), the CPU 210 returns to S435 and selects one of the unprocessed object regions to be the target object region. When all object regions have been processed (S470: YES), the CPU 210 ends the non-character region determination process. At this point, the non-character region data representing the non-character region image AI illustrated in FIG. 4B has been generated.

According to the present embodiment described above, the CPU 210 sets a plurality of candidate character pixels in S22 to S26 of the character identification process (S20 of FIG. 2) by determining on the basis of the scan data whether each pixel in the scanned image SI is a candidate to be a character pixel. In the non-character region determination process (S28 of FIG. 2; FIG. 12), the CPU 210 generates pre-processed image data by executing a pre-process (S405 to S420 in FIG. 12) on the scan data that includes an expansion process (S415 of FIG. 12). The CPU 210 identifies non-character regions in the scanned image SI by determining whether each of a plurality of object regions arranged in the image (the pre-processed image OIb) represented by the pre-processed image data satisfies specific determination conditions (S435 to S470 of FIG. 12). Each of the pixels in the scanned image SI that was set as a candidate character pixel in S26 of FIG. 2 and that falls in a region different from a non-character region identified in S28 of FIG. 2 is identified as a character pixel (S29 of FIG. 2). Specific object pixels constituting the halftone of a photo tend to appear as a single mass of pixels in the pre-processed image data owing to the expansion process (see FIG. 13B). Thus, regions in the scanned image SI that include pixels constituting halftones, such as photos, can be reliably identified as non-character regions. Pixels in regions other than non-character regions are identified as character pixels. Hence, by performing determinations using the pre-processed image data to set regions that include pixels constituting halftones as non-character regions in S28 of FIG. 2, the CPU 210 can prevent pixels constituting halftones from being incorrectly identified as character pixels, even when pixels constituting halftones were incorrectly set as candidate character pixels in S26 of FIG. 2, for example. Therefore, character pixels in the scanned image SI can be accurately identified, even in images that contain halftones.

In the non-character region determination process of the present embodiment (FIG. 12), the CPU 210 executes the contraction process (S420) after the expansion process (S415) in the pre-process to generate pre-processed image data. This method reduces the likelihood that specific object pixels corresponding to characters will become a single mass of pixels in the pre-processed image OIb. For example, even if the thin lines configuring characters partially merge with other neighboring lines in the expansion process, these lines can be subsequently separated through the contraction process. Thus, this process prevents regions corresponding to characters in the scanned image SI from being incorrectly identified as non-character regions.

In the present embodiment, the specific determination conditions for setting non-character regions include a condition that the ratio of specific object pixels occupying the bounding rectangle OS (the occupancy ratio PR) be greater than or equal to a reference ratio (the threshold Rth; S455 of FIG. 12). Since it is highly likely that a photo has a rectangular shape, while text is configured of fine lines, an object region corresponding to a photo (the object region TA1, for example) is likely to have a higher occupancy ratio PR than an object region corresponding to a character (the object region TA3, for example). Thus, non-character regions can be reliably identified using the occupancy ratio PR.

In the present embodiment, the specific determination conditions for setting non-character regions include a condition that the number of specific object pixels (the pixel number PN) in the object region be greater than or equal to a reference number (the threshold Nth; S445 of FIG. 12). A photo used as an example of a non-character in the present embodiment is configured of a single mass of specific object pixels, as illustrated in FIG. 13B, and is highly likely to occupy a considerable amount of area in the scanned image SI. However, characters are configured of fine lines and are highly likely to occupy a relatively small area. Accordingly, an object region corresponding to a photo (the object region TA1, for example) is likely to have a larger pixel number PN than an object region corresponding to a character (the object region TA3, for example), as in the example of FIG. 13B. Thus, non-character regions can be reliably identified using the pixel number PN.

In the present embodiment, the degree of contraction in the contraction process of S420 of FIG. 12 is greater than the degree of expansion in the expansion process of S415 of FIG. 12. Thus, fine lines that become merged in the expansion process can be reliably separated from each other in the contraction process. Therefore, this method can more effectively suppress specific object pixels corresponding to a character from becoming a single mass of pixels.

In the present embodiment, the expansion process is performed one time in S415 of FIG. 12, while the contraction process is performed three times in S420 of FIG. 12. That is, the expansion process in the present embodiment includes a single unit expansion process, while the contraction process includes three unit contraction processes. Thus, the degree of contraction in the contraction process of S420 of FIG. 12 can easily be set greater than the degree of expansion in the expansion process of S415 of FIG. 12.

In the non-character region determination process of the present embodiment, the CPU 210 sets regions configured of a plurality of contiguous specific object pixels in the pre-processed image OIb as object regions using the pre-processed image data (S425 of FIG. 12). Thus, the CPU 210 can set suitable object regions for determining whether the regions are non-character regions.

In the non-character region determination process of the present embodiment, the CPU 210 prepares canvas data in S430 of FIG. 12 by setting the initial value of each pixel in the canvas data to the value "0" indicating that the pixel belongs to a region other than a non-character region. Subsequently, the CPU 210 sets only those object regions determined to be non-character regions as non-character regions (S460 of FIG. 12). Hence, any region (a white background region, for example) in the pre-processed image OIb configured of pixels other than specific object pixels (i.e., non-specific object pixels) is identified as a region other than a non-character region (FIG. 4B). Thus, no problems arise when specific object pixels corresponding to characters are eliminated in the contraction process of S420 of FIG. 12, for example. Accordingly, all character pixels can be identified without omissions.

In the present embodiment, the CPU 210 generates minimum component data from the scan data (S405 of FIG. 12), generates pre-expansion image data using the minimum component data (S410 of FIG. 12), and executes a process that includes the expansion process on the pre-expansion image data (S415 and S420 of FIG. 12) to generate the pre-processed image data. Thus, by using the minimum component data, the CPU 210 can accurately identify pixels constituting halftones as specific object pixels, and can thereby accurately identify non-character regions.

According to the embodiment described above (FIG. 2), the CPU 210 executes the non-character region determination process of S28 and the synthesizing process of S29 of FIG. 2 when the enlargement ratio Lr used in the enlargement process of S15 is less than the threshold Lth (S27: YES). In other words, pixels in the scanned image SI are identified as character pixels in this case when set as candidate character pixels in S22 to S26 and not set as non-character pixels in S28. However, the processes in S28 and S29 are not executed when the enlargement ratio Lr is greater than or equal to the threshold Lth (S27: NO). In this case, pixels in the scanned image SI are identified as character pixels when set as candidate character pixels. Thus, character pixels are suitably identified on the basis of the enlargement ratio Lr used when generating the scan data.

More specifically, when the scanned image SI is enlarged by an enlargement ratio greater than or equal to the threshold Lth before being outputted (printed in the present embodiment), the halftone dots themselves are relatively large in the outputted image. However, although the halftone dots are noticeable, in most cases they do not appear unnatural. For this reason, if the enlargement ratio Lr is greater than or equal to the threshold Lth, seeing the large halftone dots clearly in the outputted image produces a more natural appearance in most cases than when they are indistinct. Further, since the image of an original should be enlarged and outputted as is when producing an enlarged copy, it is likely preferable to enlarge the halftone dots and output the enlarged dots as is. Further, when halftone dots are enlarged to a certain size or greater, moiré patterns are no longer generated by interference with periodic components in the printed dots. Therefore, when the enlargement ratio Lr is greater than or equal to the threshold Lth, it is likely preferable for the edges of halftone dots to be subjected to the edge enhancement process rather than the smoothing process, as with the edges of characters. Therefore, when the enlargement ratio Lr is greater than or equal to the threshold Lth, it is preferable that all candidate character pixels in the scanned image SI that include character pixels and pixels constituting the edges of halftone dots be identified as character pixels.

From the above description, it is clear that the minimum component data of the first embodiment is an example of the first image data of the present disclosure, the specific determination condition is an example of the first determination condition of the present disclosure, the specific object pixel of the first embodiment is an example of the specific object pixel satisfying the first determination condition of the present disclosure, and the pre-expansion image data of the first embodiment is an example of the intermediate image data of the present disclosure.

B. Second Embodiment

Next, a second embodiment of the present disclosure will be described while referring to FIGS. 16 to 23D wherein like parts and components are designated by the same reference numerals to avoid duplicating description.

B-1: Image Process

Figure 16:
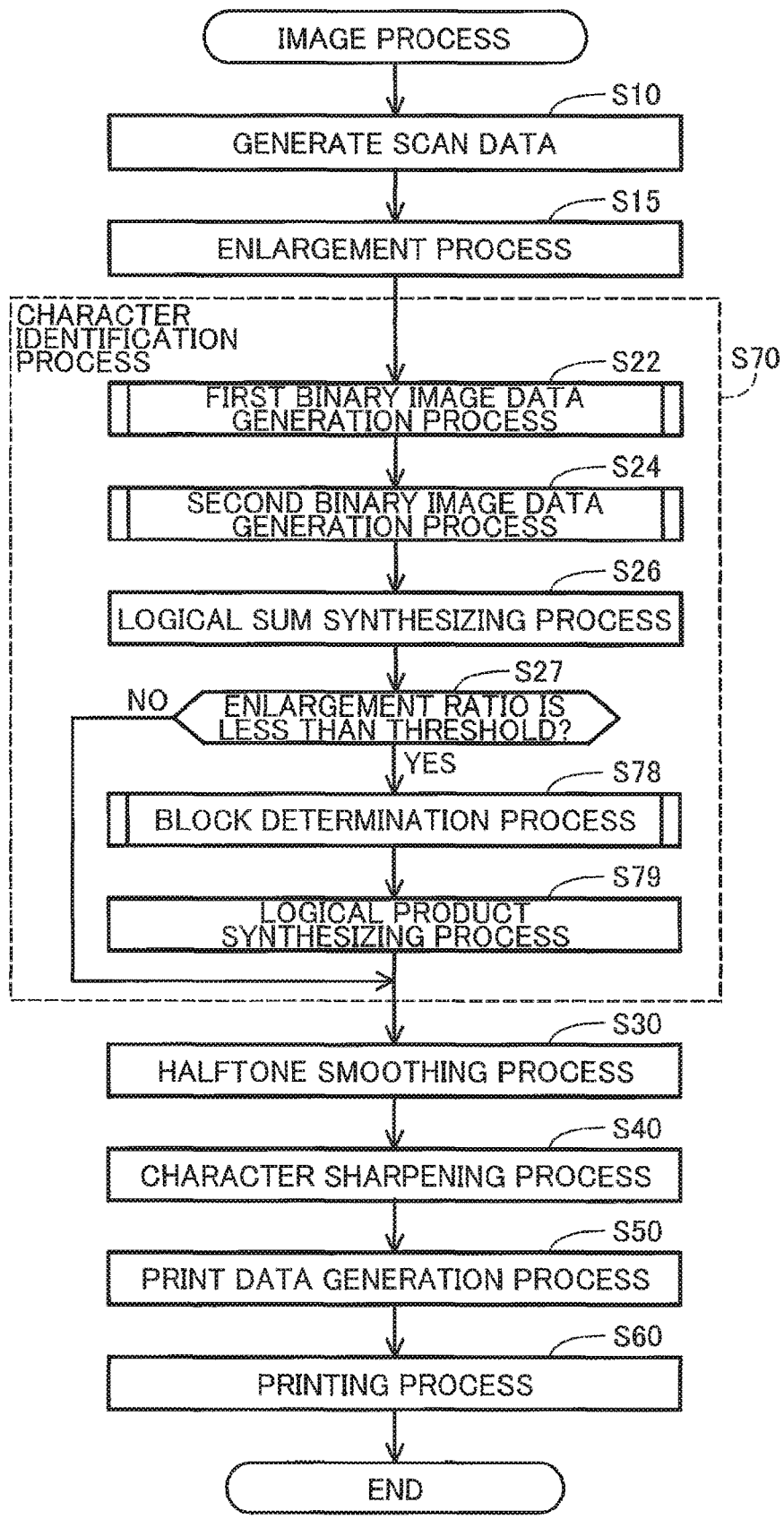
FIG. 16 is a flowchart illustrating steps in an image process executed by a multifunction peripheral according to a second embodiment.

FIG. 16 is a flowchart illustrating steps in an image process executed on a multifunction peripheral according to the second embodiment. The image process according to the second embodiment differs from the image process according to the first embodiment (FIG. 2) only in that the content of the character identification process (S70) differs from the content of the character identification process (S20) according to the first embodiment. In the following description, steps identical to those in the first embodiment are designated with the same step numbers to avoid duplicating description.

After the scan data is generated as target image data by reading an original (S10) and an image represented by the scan data is enlarged by an enlargement ratio Lr (S15), in S70 the CPU 210 executes a character identification process on the scan data that has been subjected to the enlargement process (hereinafter called scan data).

FIGS. 17A to 17D are views illustrating an example of images used in the image process executed on the multifunction peripheral according to the second embodiment. FIG. 17A illustrates an example of a scanned image SI2 represented by the scan data. The scanned image SI2 is configured of a plurality of pixels arranged in a matrix that has the first direction D1 and the second direction D2, as in the first embodiment.

The scanned image SI2 illustrated in FIG. 17A includes a white background Bg21 indicating the base color of the paper constituting the original, three objects Ob21 to Ob23 that are not characters, and four objects Ob24 to Ob27 that are characters, and a background Bg22 that is a background of the four objects Ob24 to Ob27. In the present embodiment, the non-character objects are photos. The background Bg22 is a uniform image having a color different from white. Hereinafter, the objects Ob21 to Ob23 are also called photo objects Ob21 to Ob23, and objects Ob24 to Ob27 are also called character objects Ob24 to Ob27.

By performing the character identification process, the CPU 210 generates binary image data specifying a "1" value for each character pixel and a "0" value for each non-character pixel (hereinafter called character identification data), for example. FIG. 17B illustrates an example of a character identification image TI2 represented by the character identification data. In this character identification image TI2, the pluralities of pixels constituting edges of the four character objects Ob24 to Ob27 in the scanned image SI2 are identified as character pixels Tp24 to Tp27. Note that only pixels constituting the edges of characters are identified as character pixels in the case of relatively large characters, while all pixels constituting the characters are identified as character pixels in the case of relatively small characters. The character identification process will be described later in greater detail.

In S30 the CPU 210 executes the halftone smoothing process on the scan data to generate smoothed image data representing a smoothed image, as in the first embodiment.

FIG. 17C illustrates an example of a smoothed image GI2 represented by the smoothed image data. The smoothed image GI2 includes a white background Bg21g, and objects Ob21g to Ob27g and background Bg22g produced by smoothing the objects Ob21 to Ob27 and background Bg22 in the scanned image SI2. Portions of these objects Ob21g to Ob27g and background Bg22 other than the character objects Ob24g to Ob27g (hereinafter called non-character portions) are smoothed through comparison with the scanned image SI2.

In S40 the CPU 210 executes the character sharpening process on the smoothed image data to generate processed image data, as in the first embodiment.

FIG. 17D illustrates an example of a processed image FI2 represented by the processed image data. The processed image FI2 includes a white background Bg21f, and objects Ob21f to Ob27f and background Bg22f corresponding to the objects Ob21 to Ob27 and background Bg22 in the scanned image SI2. The edges of the character objects Ob24f to Ob27f among these objects are sharper than those of the character objects Ob24 to Ob27 in the scanned image SI2 and the character objects Ob24g to Ob27g in the smoothed image GI2. The edges of the photo objects Ob21f to Ob23f and background Bg22f have not been sharpened.

From the above description, it is clear that the objects Ob21f to Ob27f and the background Bg22f in the processed image FI2 include sharpened characters and smoothed non-characters.

In S50 the CPU 210 executes the print data generation process to generate print data from the processed image data, as in the first embodiment.

In S60 the CPU 210 executes the printing process and subsequently ends the image process.

Through the image process described above, as in the image process of the first embodiment (FIG. 2), the CPU 210 generates processed image data that includes values for a plurality of character pixels that have undergone the sharpening process (S40), and values for a plurality of non-character pixels that have undergone the smoothing process (S30). As a result, the CPU 210 can generate processed image data representing an aesthetically pleasing processed image FI2.

Also in the processed image data, values that have undergone the smoothing process are used for the values of non-character pixels constituting objects in the processed image FI2 other than characters, such as photos. This method suppresses the appearance of halftone dots, which can produce moiré patterns, for example, in parts of the processed image FI2 other than characters, thereby suppressing the generation of moiré patterns and other artifacts in the printed processed image FI2. Thus, this process can improve the aesthetic appearance of the printed processed image FI2. This method also prevents edges in photos from being overly emphasized, thereby further improving the appearance of the processed image FI2.

B-2: Character Identification Process

Next, the character identification process of S70 in FIG. 16 will be described. In S22 the CPU 210 executes a first binary image data generation process using the scan data to generate first binary image data. The first binary image data is binary data specifying edge pixels and non-edge pixels. Here, edge pixels specified by the first binary image data will be called first edge pixels, and non-edge pixels specified by the first binary image data will be called first non-edge pixels. Since this first binary image data generation process is the same process as the first binary image data generation process of the first embodiment illustrated in FIG. 5, the duplicating description about this process is omitted.

In S24 the CPU 210 executes a second binary image data generation process using the scan data to generate second binary image data. The second binary image data is binary data specifying edge pixels and non-edge pixels, similar to the first binary image data. However, the second binary image data differs from the first binary image data in that the second binary image data is generated according to a different process than that used to generate the first binary image data. Here, edge pixels specified by the second binary image data will be called second edge pixels, while non-edge pixels specified by the second binary image data will be called second non-edge pixels. Since this second binary image data generation process is the same process as the second binary image data generation process of the first embodiment illustrated in FIG. 9, the duplicating description about this process is also omitted.

In S26 the CPU 210 executes a logical sum synthesizing process to synthesize the first binary image data generated in S22 with the second binary image data generated in S24 to generate final binary image data specifying the identified edge pixels and non-edge pixels (hereinafter also called edge identification data).

Edge pixels identified by the edge identification data become candidates for character pixels and, hence, will be called first candidate character pixels. The edge identification data is binary image data whose values are set to "1" for first candidate character pixels (edge pixels in the present embodiment) and "0" for pixels that are not candidates for character pixels (non-edge pixels in the present embodiment).

Figure 18A:
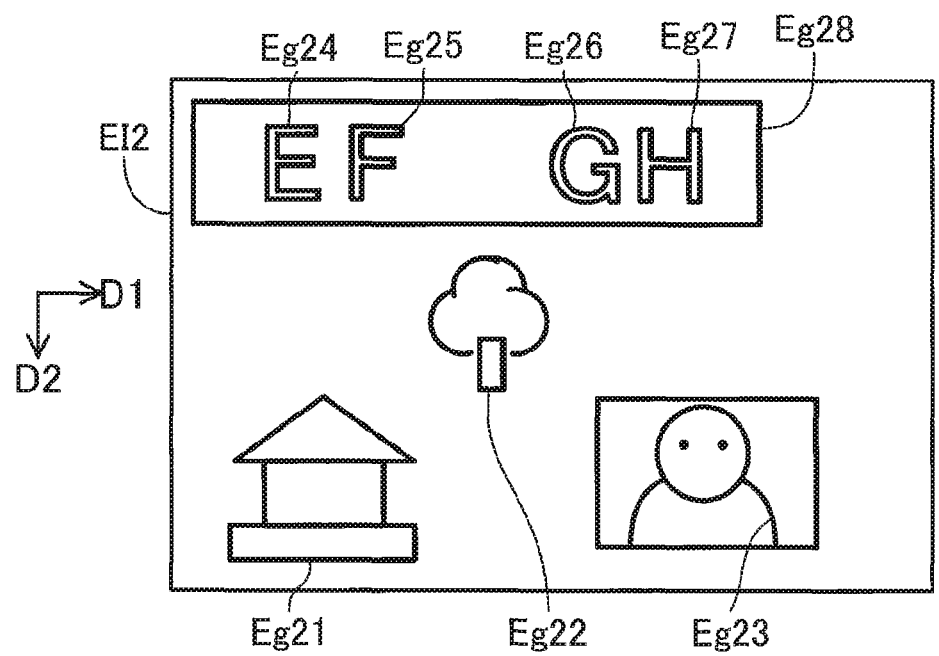
Figure 18B:
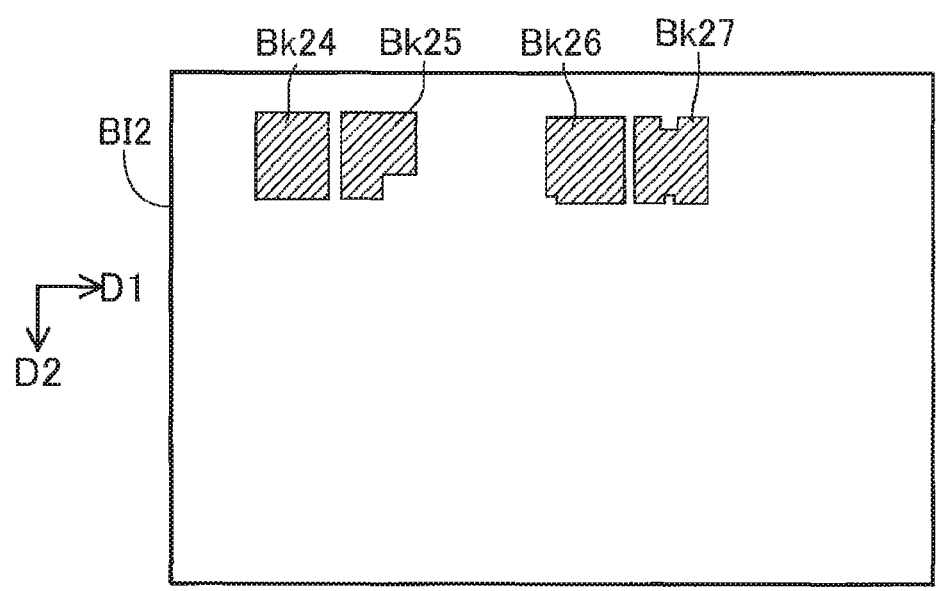

FIGS. 18A and 18B illustrate an example of images used in the character identification process. FIG. 18A illustrates an example of an edge identification image EI2 represented by the edge identification data. In this edge identification image EI2, a plurality of edge pixels constituting edges Eg21 to Eg27 of the objects Ob21 to Ob27 in the scanned image SI2 have been identified as first candidate character pixels. Thus, edges specified by the first candidate character pixels include the edges of characters. These edges also include thin lines in objects other than characters (photos, for example).

In S27 the CPU 210 determines whether the enlargement ratio Lr used in the enlargement process of S15 is less than a threshold Lth. The threshold Lth of the enlargement ratio is set to 3 (300%), for example. When the enlargement ratio Lr is less than the threshold Lth (S27: YES), the CPU 210 advances to S78.

In S78 the CPU 210 executes a block determination process on the scan data to generate binary image data (hereinafter called block determination data) specifying second candidate character pixels denoting candidates for character pixels, and pixels that are not second candidate character pixels. In the block determination process, the CPU 210 uses the scan data to determine for each of a plurality of blocks arranged in the scanned image SI2 whether the block is a character block specifying a character. A single block is a rectangular region that includes N-number pixels (where N is an integer of two or greater). As will be described later in greater detail, the CPU 210 determines whether the pixels in the scanned image SI2 are second candidate character pixels based on the determination results for each block. The block determination data is binary image data whose values are set to "1" for second candidate character pixels and "0" for pixels that are not second candidate character pixels.

FIG. 18B illustrates an example of a block determination image BI2 represented by the block determination data. Second candidate character pixels Bk24 to Bk27 specifying regions in which the character objects Ob24 to Ob27 in the scanned image SI2 are arranged have been identified in the block determination image BI2. Thus, regions represented by second candidate character pixels include character regions that contain characters, but do not include regions that contain objects other than characters (photos, for example).

In S79 the CPU 210 executes a logical product synthesizing process to synthesize the edge identification data generated in S26 with the block determination data generated in S78, producing the character identification data described above (see FIG. 17B) that specifies character pixels and non-character pixels. Specifically, the CPU 210 generates binary image data as the character identification data by taking the logical product for each corresponding pixel in the edge identification data and block determination data. In other words, the CPU 210 identifies pixels in the scanned image SI2 that were set as first candidate character pixels in S22 to S26 and that were set as second candidate character pixels in S78 to be character pixels. The CPU 210 identifies pixels in the scanned image SI2 that were not set as first candidate character pixels and pixels that were not set as second candidate character pixels to be non-character pixels. After generating the character identification data, the CPU 210 ends the character identification process.

On the other hand, if the CPU 210 determines in S27 that the enlargement ratio Lr is greater than or equal to the threshold Lth (S27: NO), the CPU 210 skips S78 and S79 and ends the character identification process. In this case, the edge identification data generated through the logical sum synthesizing process of S26 becomes the final character identification data. That is, in this case the CPU 210 identifies character pixels to be those pixels set as first candidate character pixels in S22 to S26. As a variation, the CPU 210 may execute the determination in S27 after executing the block determination process of S78. In other words, the CPU 210 may determine whether the enlargement ratio Lr is less than the threshold Lth after step S78. Here, the CPU 210 also executes the process in S79 to generate character identification data when the enlargement ratio Lr is less than the threshold Lth. If the enlargement ratio Lr is greater than or equal to the threshold Lth, the CPU 210 skips S79 and sets the edge identification data generated through the logical sum synthesizing process of S26 as the final character identification data.

B-3: Block Determination Process

Figure 19:
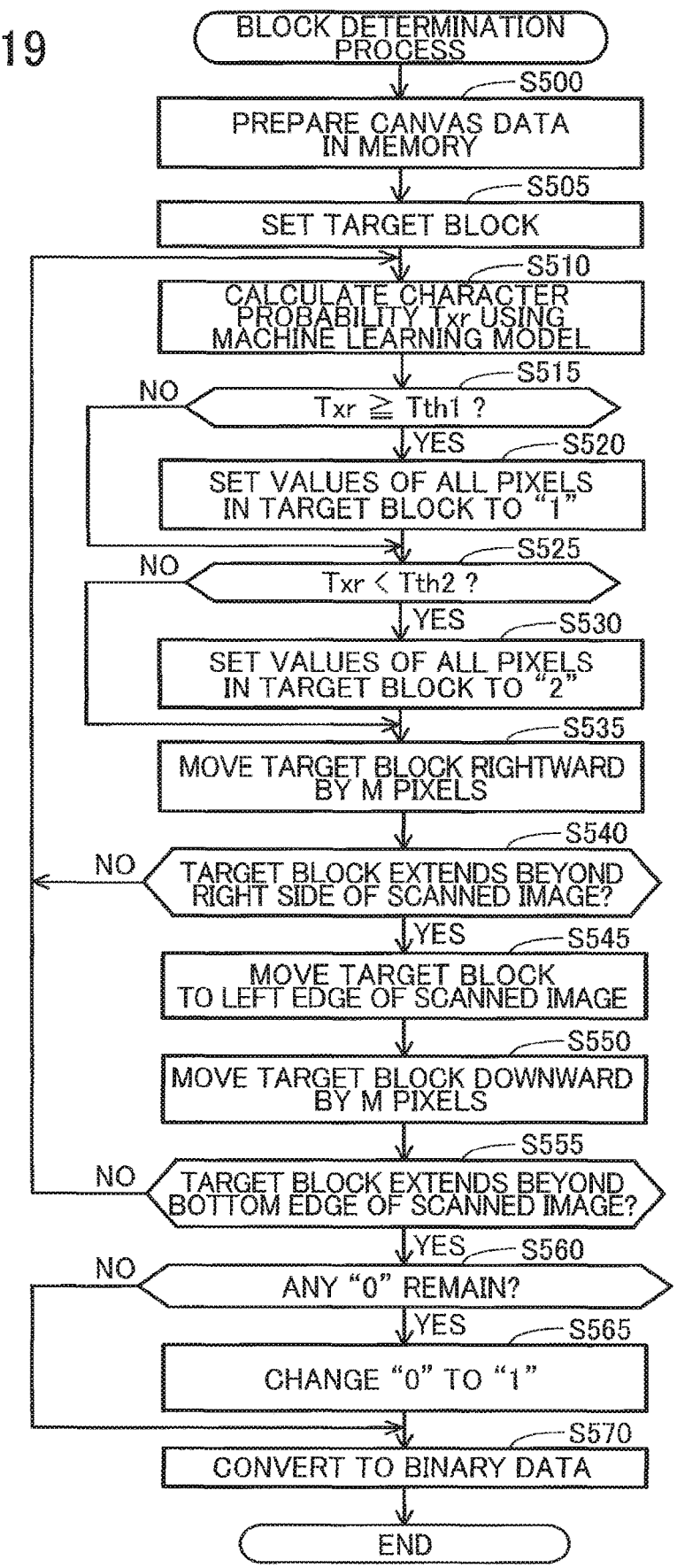
FIG. 19 is a flowchart illustrating steps in a block determination process executed by the multifunction peripheral according to the second embodiment.
Figure 20:
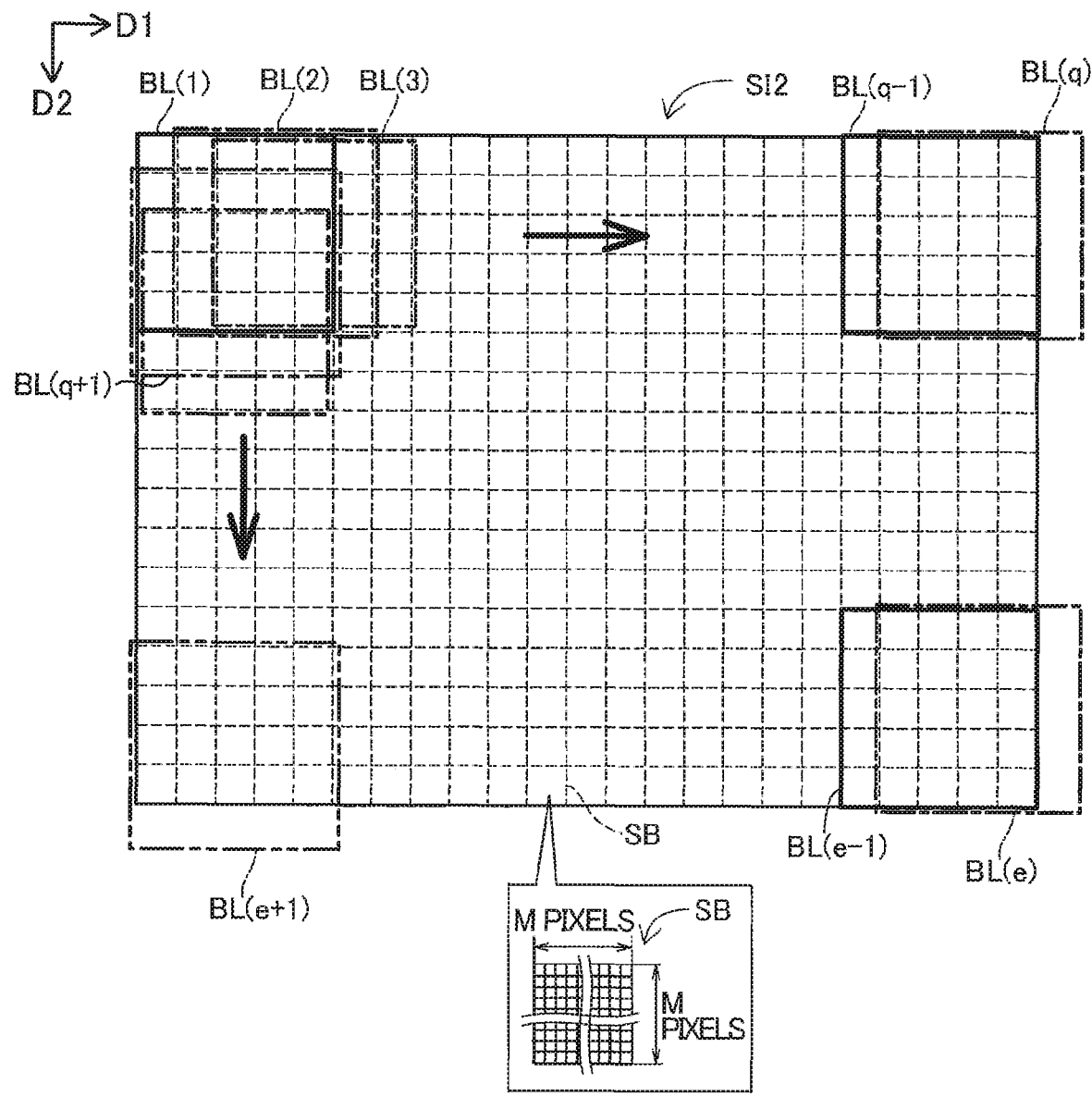
FIG. 20 is an explanatory diagram illustrating a plurality of blocks arranged in the scanned image.

Next, the block determination process of S78 in FIG. 16 will be described. FIG. 19 is a flowchart illustrating steps in the block determination process. FIG. 20 is an explanatory diagram illustrating a plurality of blocks BL arranged in the scanned image SI2. In the block determination process, the CPU 210 generates block determination data specifying second candidate character pixels, which are candidates for character pixels, and pixels that are not candidate character pixels by determining whether each of a plurality of blocks BL arranged in the scanned image SI2 is a character block specifying a character, as described above.

In S500 of FIG. 19, the CPU 210 prepares canvas data in a memory (and specifically the buffer area of the volatile storage device 220) for generating block determination data. A canvas (initial image) represented by this canvas data is an image having the same size and, hence, the same number of pixels as the scanned image SI2. Each pixel in the canvas data is set to a prescribed initial value (0, for example).

In S505 the CPU 210 sets a target block in the scanned image SI2. In the present embodiment, the first target block is a block BL(1) positioned in the upper-left corner of FIG. 20. A single block is a rectangular region that includes N-number pixels (where N is an integer of two or greater). In FIG. 20, each of a plurality of individual squares depicted by dashed lines and arranged in a matrix over the scanned image SI2 denotes a sub-block SB. A single sub-block SB is a rectangular region that includes k-number pixels (where k is an integer that satisfies the expression $1 \leq k < N$). In the present embodiment, a sub-block SB is a region having M-number pixels vertically by M-number pixels horizontally (where M is an integer of one or greater; hence, $k = M \times M$). In the present embodiment, a single block BL is a region that includes L (vertical)×L (horizontal) number of sub-blocks SB (where L is an integer of two or greater). In other words, each block BL in the present embodiment is a region having (L×M) number of pixels vertically by (L×M) number of pixels horizontally. In the present embodiment, M is ten and L is five. Accordingly, each block BL is a region having fifty pixels vertically by fifty pixels horizontally (N=2,500).

In S510 the CPU 210 uses a machine learning model to calculate the probability that the image in the target block represents characters (hereinafter called a character probability Txr).

Machine learning models are models that use convolution neural networks (CNNs). Some examples of CNNs used as machine learning models are LeNet and AlexNet. LeNet was published in "Y. LeCun, L. Bottou, Y. Bengio, and P. Haffner: Gradient-based Learning Applied to Document Recognition, Proceedings of the IEEE 86(11), November 1998, 2278-2324," for example. AlexNet was published in "Alex Krizhevsky, Ilya Sutskever, and Geoffrey E. Hinton: ImageNet Classification with Deep Convolution Neural Networks, Advances in Neural Information Processing Systems 25, eds. F. Pereira, C. J. C. Burges, L. Bottou, and K. Q. Weinberger, Curran Associates, Inc., 1097-1105, 2012," for example.

The input of the machine learning model is a matrix in which the values of the N-number pixels in the target block (RGB values and luminance values, for example) are arranged in an order based on the positions of the pixels in the target block. Hence, the values of the N-number pixels in the target block are inputted in association with the positions of the pixels in the target block. The output of the machine learning model is the character probability Txr described above.

Training of the machine learning model is performed using a prescribed number (3,000, for example) of character images representing characters and a prescribed number (3,000, for example) of non-character images not representing characters, for example. The character images and non-character images used for training have the same size as a block BL that contains N-number pixels. The non-character images represent objects other than characters (photos, for example), uniform backgrounds, or the like.

The character probability Txr is expressed by a numerical value between 0% and 100%, for example. As indicated in S515 to S530 described later, the CPU 210 determines on the basis of the character probability Txr whether the target block is a character block representing characters, a non-character block not representing characters, or an unknown block indicating uncertainty regarding character representation. The CPU 210 determines that the target block is a character block when the character probability Txr is greater than or equal to a threshold Tth1. The CPU 210 determines that the target block is an unknown block when the character probability Txr is greater than or equal to a threshold Tth2 but less than the threshold Tth1. The CPU 210 determines that the target block is a non-character block when the character probability Txr is less than the threshold Tth2. The threshold Tth1 is 75% and the threshold Tth2 is 25%, for example.

Thus, a different character probability Txr may be outputted for images having N-number pixels with the same combination of values, depending on what values of pixels are at what positions in the target block, and the type of target block is determined on the basis of this character probability Txr. In this way, the target block is determined to be a character block, non-character block, or unknown block according to the positions of the N-number pixels in the target block and the values of the N-number pixels.

FIGS. 21A to 21D illustrate samples of determinations for individual blocks BL. For example, when block BL(1) in FIG. 21A or block BL(2) in FIG. 21B is the target block, the CPU 210 determines that the target block is a character block since characters occupy a relatively large area of the target block. When block BL(3) in FIG. 21C is the target block, the CPU 210 determines that the target block is an unknown block, even though the target block includes characters, because the area occupied by the characters is relatively small. When block BL(4) in FIG. 21D is the target block, the CPU 210 determines that the target block is a non-character block because the block does not include characters. Next, the process in S515 to S530 will be described in greater detail.

In S515 of FIG. 19, the CPU 210 determines whether the character probability Txr calculated in S510 is greater than or equal to the threshold Tth1. When the character probability Txr is greater than or equal to the threshold Tth1 (S515: YES), the CPU 210 determines that the target block is a character block. Accordingly, in S520 the CPU 210 sets the values for all pixels in the target block to the value specifying a character, that is, "1" in the present embodiment. When the character probability Txr is less than the threshold Tth1 (S515: NO), the CPU 210 skips S520 and advances to S525.

FIGS. 22A to 22D illustrate an example of setting pixel values in block determination data. FIGS. 22A to 22D conceptually illustrate the block determination image BI2 represented by the block determination data. When block BL(1) in FIG. 21A or block BL(2) in FIG. 21B is the target block, the CPU 210 determines that the target block is a character block. Accordingly, the CPU 210 sets the values in the block determination image BI2 for all pixels in block BL(1) and block BL(2) to "1" specifying characters, as illustrated in FIGS. 22A and 22B.

In S525 the CPU 210 determines whether the character probability Txr is less than the threshold Tth2. If the character probability Txr is less than the threshold Tth2 (S525: YES), the CPU 210 determines that the target block is a non-character block. Accordingly, in S530 the CPU 210 sets the values of all pixels in the target block to the value specifying a non-character, that is, "2" in the present embodiment. If the character probability Txr is greater than or equal to the threshold Tth2 (S525: NO), the CPU 210 skips S530 and advances to S535.

When block BL(4) in FIG. 21D is the target block, the CPU 210 determines that the target block is a non-character block. Hence, the CPU 210 sets all pixel values in the block determination image BI2 within block BL(4) to "2" specifying a non-character, as illustrated in FIG. 22D.

Note that when the character probability Txr is greater than or equal to the threshold Tth2 and less than the threshold Tth1 (S515: NO, S525: NO), the CPU 210 determines that the target block is an unknown block. In this case, the CPU 210 does not modify the pixel values in the target block. In other words, pixels having a "1" representing a character, pixels having a "2" representing a non-character, and pixels having a "0" representing uncertainty are all maintained at their respective values at this time.

When block BL(3) in FIG. 21C is the target block, the CPU 210 determines that the target block is an unknown block. Therefore, the CPU 210 does not modify any values in the block determination image BI2 for pixels in block BL(3), as illustrated in FIG. 22C.

In S535 the CPU 210 shifts the target block rightward by M-number pixels. That is, the target block is moved one sub-block SB to the right. For example, if block BL(1) in FIG. 20 is the target block, the new target block is set to block BL(2). When block BL(q−1) in FIG. 20 is the target block, the CPU 210 sets the new target block to block BL(q).

In S540 the CPU 210 determines whether the right edge of the target block resulting from shifting the target block to the right by M-number pixels is farther rightward than the right edge of the scanned image SI2. In other words, the CPU 210 determines whether the new target block extends beyond the right side of the scanned image SI2. For example, if the new target block is one of block BL(q) or block BL(e) in FIG. 20, the CPU 210 determines that the right edge of the target block has moved farther rightward than the right edge of the scanned image SI2.

When the right edge of the target block has not been moved farther rightward than the right edge of the scanned image SI2 (S540: NO), the CPU 210 returns to S510. In this way, the CPU 210 shifts the target block rightward M-number pixels at a time while performing the determinations in S510-S530 for each block in sequence. In the example of FIG. 20, the CPU 210 sequentially determines whether each block BL is a character block, non-character block, or unknown block in the sequence of blocks BL(1), BL(2), and BL(3).

When the right edge of the target block has been moved farther rightward than the right edge of the scanned image SI2 (S540: YES), in S545 the CPU 210 moves the target block to the left edge of the scanned image SI2 and in S550 moves the target block downward by M-number pixels.

In S555 the CPU 210 determines whether the bottom edge of the target block that has been moved downward by M-number pixels is lower than the bottom edge of the scanned image SI2. In other words, the CPU 210 determines whether the new target block extends beyond the bottom edge of the scanned image SI2. For example, when the new target block is block BL(e+1) in FIG. 20, the CPU 210 determines that the bottom edge of the target block has been moved lower than the bottom edge of the scanned image SI2.

When the bottom edge of the target block has not been moved lower than the bottom edge of the scanned image SI2 (S55: NO), the CPU 210 returns to S510. In this way, the CPU 210 shifts the target block downward by M-number pixels at a time while sequentially performing determinations on each block BL in the current row from left to right. Thus, after performing a determination on block BL(q−1) on the right edge of the scanned image SI2 in FIG. 20, the target block for the next determination is set to block BL(q+1) on the left edge of the scanned image SI2 and in a row M-number pixels lower than the row for block BL(q−1).

When the bottom edge of the target block has been moved lower than the bottom edge of the scanned image SI2 (S555: YES), the CPU 210 has completed determinations for all blocks BL and, hence, advances to S560.

In S560 the CPU 210 determines whether any "0" values specifying uncertainty remain in the block determination data. If values specifying uncertainty remain (S560: YES), in S565 the CPU 210 changes the values specifying uncertainty to a "1" value specifying a character. As a result of this process, the values for all pixels in the block determination data are either a "1" value specifying a character or a "2" value specifying a non-character.

In S570 the CPU 210 modifies all "2" values specifying a non-character to the value "0", converting the block determination data to binary data that comprises only "1" and "0" values. As a result, the CPU 210 generates block determination data in which each pixel has either a value specifying a character (i.e., the value "1" specifying a second candidate character pixel described above) or a value specifying a non-character (i.e., the value "0" not specifying a second candidate character pixel). After generating the block determination data, the CPU 210 ends the block determination process.

In S22 to S26 of the character identification process according to the present embodiment described above (S70 of FIG. 16), the CPU 210 sets a plurality of first candidate character pixels in the scanned image SI2 by determining whether each of the pixels in the scanned image SI2 is a candidate to be a character pixel. In S78 the CPU 210 sets a plurality of second candidate character pixels in the scanned image SI2 by determining whether each of a plurality of blocks BL arranged in the scanned image SI2 is a character block specifying characters. In S79 the CPU 210 sets each of the pixels in the scanned image SI2 that were determined to be first candidate character pixels and second candidate character pixels to character pixels. As a result, even when pixels constituting halftone dots are incorrectly set to first candidate character pixels when performing the above determination for each pixel, for example, the pixels constituting halftone dots are not set to second candidate character pixels when performing determinations for each block BL and, hence, are not incorrectly identified as character pixels. Consequently, the CPU 210 can accurately identify character pixels in the scanned image SI2, even when the image includes halftone dots, for example.

FIGS. 23A to 23D are explanatory diagrams illustrating the effects of the second embodiment. FIGS. 23A to 23D conceptually illustrate the scanned image SI2 represented by the scan data, the edge identification image EI2 represented by the edge identification data, the block determination image BI2 represented by the binary image data, and the character identification image TI2 represented by the character identification data, respectively. Each square defined by dashed lines in the images SI2, EI2, BI2, and TI2 specifies a pixel Px.

Figure 23A:
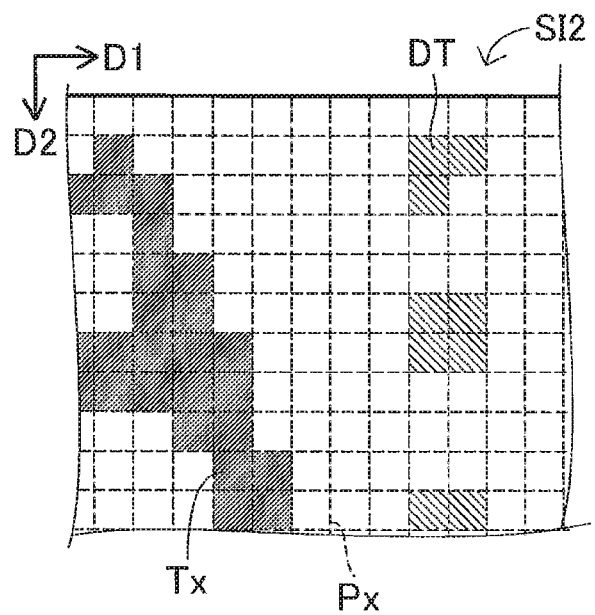
FIGS. 23A to 23D are explanatory diagrams illustrating effects of the second embodiment, in which FIG. 23A conceptually illustrates the scanned image represented by the scan data, FIG. 23B conceptually illustrates the edge identification image represented by the edge identification data, FIG. 23C conceptually illustrates the block determination image represented by the binary image data, and FIG. 23D conceptually illustrates the character identification image represented by the character identification data.
Figure 23B:
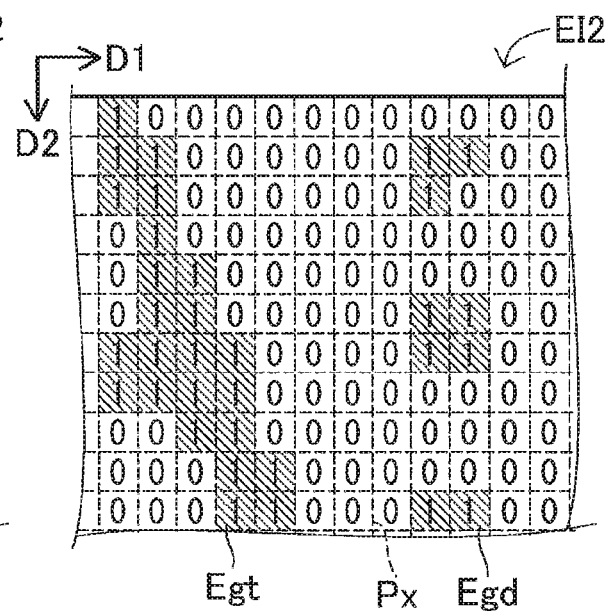
Figure 23C:
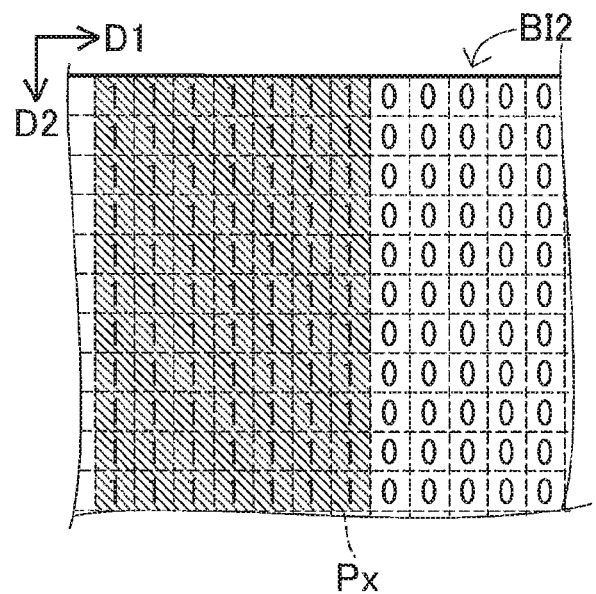

As illustrated in the example of FIG. 23A, the scanned image SI2 may include a character Tx, and halftone dots DT constituting a non-character object (a photo, for example) or a colored background because, as described above, the scan data is generated by reading printed matter. In the process for identifying edge pixels (first candidate character pixels) in S22 to S26 of FIG. 16 in the second embodiment, various techniques have been implemented to suppress halftone dots from being incorrectly identified as first candidate character pixels, as described above. However, it is difficult to sufficiently suppress halftone dots from being incorrectly identified as first candidate character pixels when placing an emphasis on avoiding omissions in the identification of first candidate character pixels representing the edges of characters. Consequently, the first candidate character pixels identified in the edge identification data may include not only edge pixels Egt corresponding to the character Tx, but also edge pixels Egd corresponding to the halftone dots DT, as in the edge identification image EI2 of FIG. 23B.

Since the block determination process of S78 of FIG. 16 according to the second embodiment performs determinations on each block BL including a determination regarding whether the block BL is a character block on the basis of the positions of N-number pixels in the block and the values of the N-number pixels, in correct determinations are relatively low despite the spatial resolution being lower than that of determinations for each pixel. Thus, while the determinations are general, in the example of the block determination image BI2 in FIG. 23C, pixels in the region that includes the character Tx are identified as second candidate character pixels while pixels in the region that includes the halftone dots DT are not identified as second candidate character pixels.

Figure 23D:
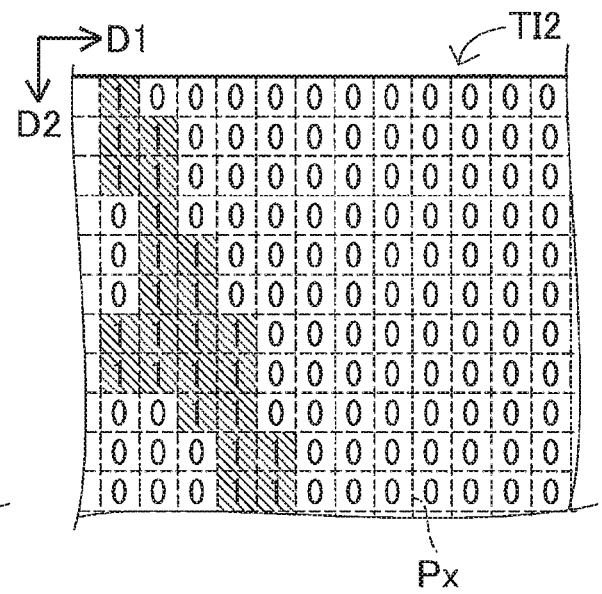

Thus, when generating character identification data by taking the logical sum of the edge identification data and block determination data, the CPU 210 can accurately identify pixels representing the character Tx to be character pixels and can accurately identify pixels representing the halftone dots DT to be non-character pixels, as illustrated in the character identification image TI2 of FIG. 23D.

This process also results in the removal of pixels incorrectly identified as character pixels despite representing halftone dots DT, thereby eliminating the need to execute a noise removal process on the character identification data to remove isolated character pixels. In some cases, this type of noise removal process not only removes character pixels representing halftone dots DT, but may also remove character pixels that tend to be isolated, such as periods, commas, and diacritic marks. Since it is important not to remove character pixels that represent periods, commas, diacritic marks, and the like, their accidental removal could cause unclarity or other problems in parts of the characters, resulting in reduced quality of the outputted image.

In the embodiment described above, the CPU 210 determines that the target block is a character block when the character probability Txr is greater than or equal to the threshold Tth1 (S515 of FIG. 19: YES). Thus, the CPU 210 can accurately determine character blocks on the basis of the positions and values of N-number pixels in the target block.

Further, in the present embodiment, block BL(1), block BL(2), block BL(3), and block BL(4) partially overlap one another, as illustrated in FIGS. 21A to 21D and FIGS. 22A to 22D. The CPU 210 determines whether n-number pixels in the overlapping region of these blocks (where n is an integer satisfying the expression 0<n<N) are pixels representing a character (second candidate character pixels) on the basis of at least one determination result for a plurality of overlapping blocks. As a result, the CPU 210 can generate block determination data indicating whether pixels are second candidate character pixels in units of sub-blocks SB that are smaller than the blocks BL.

For example, when the CPU 210 determines that the target block is a character block or a non-character block in S520 or S530 of FIG. 19 in the present embodiment, the CPU 210 sets values in the binary image data for all pixels in the target block on the basis of the determination result. For example, take the case in which the CPU 210 determines that both the first block and the second block are blocks other than unknown blocks (i.e., character blocks or non-character blocks). Here, the determination result for the block that came later in the order of determination among the first and second blocks (the second block in this case) takes precedence for the overlapping region of the first and second blocks (see FIGS. 22A to 22D).

When the CPU 210 determines that the target block is an unknown block, the values for all pixels in the target block remain unchanged in the present embodiment. For example, take the case in which one of the first block and second block is determined to be an unknown block, while the other is determined to be either a character block or a non-character block. In this case, the determination result for the block determined to be either a character block or a non-character block takes precedence for the overlapping region between the first and second blocks (see FIGS. 22B to 22D). In other words, when the first block is determined to be an unknown block and the second block is determined to be a character block, the pixels in the overlapping region are set to pixels representing a character (second candidate character pixels). When the first block is determined to be an unknown block and the second block is determined to be a non-character block, the pixels in the overlapping region are set to pixels representing a non-character (pixels that are not second candidate character pixels). When the first block is determined to be a character block and the second block is determined to be an unknown block, the pixels in the overlapping region are set to pixels representing a character. When the first block is determined to be a non-character block and the second block is determined to be an unknown block, the pixels in the overlapping region are set to pixels representing a non-character. Thus, by determining whether each block is a character block, non-character block, or unknown block, the CPU 210 can accurately determine whether the pixels in the overlapping region represent characters (second candidate character pixels).

When the enlargement ratio Lr used in the enlargement process of S15 in FIG. 16 is less than the threshold Lth in the second embodiment (S27: YES), the CPU 210 executes the block determination process of S78 and the logical OR synthesizing process of S79. That is, in this case the CPU 210 identifies pixels in the scanned image SI2 that were set to first candidate character pixels in S22 to S26 and that were set to second candidate character pixels in S78 as character pixels. When the enlargement ratio Lr is greater than or equal to the threshold Lth (S27: NO), the processes of S78 and S79 are not executed. In this case, the CPU 210 identifies pixels in the scanned image SI2 that were set as first candidate character pixels to be character pixels. Thus, the CPU 210 can accurately identify character pixels on the basis of the enlargement ratio Lr used for generating the scan data. More specifically, when the scanned image SI2 is enlarged using an enlargement ratio greater than or equal to the threshold Lth and outputted (printed in the present embodiment), the halftone dots in the outputted image are relatively large and, in most cases, do not appear unnatural even though they are more noticeable. Accordingly, while large halftone dots are clearly visible in the outputted image when the enlargement ratio Lr is greater than or equal to the threshold Lth, they typically appear more natural than when they are indistinct. Further, when producing an enlarged copy of an original, it is desirable simply to enlarge the original directly and to output an image representing the enlarged original. Accordingly, it is also likely preferable to enlarge the halftone dots and output an image with the enlarged dots when producing an enlarged copy. Further, when halftone dots are enlarged to a certain size or greater, moiré patterns caused by interference with periodic components in the printed dots are unlikely to appear. Thus, as with edges of characters, edges of halftone dots are preferably subjected to the edge enhancement process rather than the smoothing process when the enlargement ratio Lr is greater than or equal to the threshold Lth. Therefore, it may be preferable to identify first candidate character pixels in the scanned image SI2 that could be either character pixels or pixels configuring the edges of halftone dots as character pixels when the enlargement ratio Lr is greater than or equal to the threshold Lth.

In S510 to S530 of FIG. 19 in the second embodiment, the CPU 210 employs a machine learning model trained using a plurality of character images and a plurality of non-character images to determine whether each of a plurality of blocks BL in the scanned image SI2 is a character block. As a result, the CPU 210 can reliably determine character blocks using the machine learning model.

C. Variations of the Embodiments (1) In the non-character region determination process of FIG. 12 according to the first embodiment described above, the pre-process includes the contraction process in S420, but the contraction process of S420 may be omitted. In this case, regions corresponding to the objects Ob1 and Ob2 can still be identified as non-character regions in the non-character region determination process. However, since the occupancy ratio PR of the character regions is a larger value than that in the first embodiment described above, the threshold value, such as the threshold Rt in the determination of S455, is set higher than that in the first embodiment.

(2) In the non-character region determination process of FIG. 12 according to the first embodiment described above, the degree of contraction in the contraction process of S420 is greater than the degree of expansion in the expansion process of S412. However, the degree of contraction may be set the same as the degree of expansion instead. Alternatively, the degree of contraction in the contraction process may be set smaller than the degree of expansion in the expansion process.

(3) In the non-character region determination process of FIG. 12 according to the first embodiment described above, the number of expansion processes performed in S415 is one, but the present invention is not limited to one expansion process. In general, the expansion process of S415 should include J-number unit expansion processes (where J is an integer of one or greater). Similarly, the number of contraction processes in S420 is three in the first embodiment, but the present invention is not limited to three contraction processes. In general, the contraction process of S420 should include K-number unit contraction processes (where K is an integer of 1 or greater). Here, K and J are preferably set to satisfy the expression K>J in order that the degree of contraction in the contraction process is greater than the degree of expansion in the expansion process.

(4) In the non-character region determination process of FIG. 12 according to the first embodiment described above, the degree of contraction in the contraction processes of S420 is set greater than the degree of expansion in the expansion process of S415 by setting the number of contraction processes greater than the number of expansion processes. However, the degree of contraction in the contraction process may be set greater than the degree of expansion in the expansion process by setting the filter F2 used in the contraction process larger than the filter F1 used in the expansion process.

(5) In the non-character region determination process according to the first embodiment described above, a plurality of contiguous specific object pixels is set for each of the object regions TA1 to TA6 (S425; see FIG. 13B). As an alternative, a plurality of rectangular object regions may be set in the pre-processed image OIb by dividing the pre-processed image OIb into square shapes, for example. Consequently, an object region may include both specific object pixels and non-specific object pixels. In this case, the CPU 210 may determine that the object region is a non-character region when the number of specific object pixels in the object region is greater than or equal to a threshold or may determine that the object region is a non-character region when the ratio of the number of specific object pixels in the object region to the total number of pixels in the object region is greater than or equal to a threshold.

(6) In the non-character region determination process according to the first embodiment described above, the specific determination conditions for determining whether an object region is a non-character region include the condition that the pixel number PN be greater than or equal to the threshold Nth and the condition that the occupancy ratio PR be greater than or equal to the threshold Rth, but the specific determination conditions are not limited to these conditions. For example, the specific determination conditions may include the condition that the pixel number PN be greater than or equal to the threshold Nth or that the occupancy ratio PR be greater than or equal to the threshold Rth. Alternatively, the condition of the pixel number PN being greater than or equal to the threshold Nth may be used as the only specific determination condition or the condition of the occupancy ratio PR being greater than or equal to the threshold Rth may be used as the only specific determination condition. The specific determination conditions may also include other conditions, such as a condition that the aspect ratio of the object region falls within a prescribed range of aspect ratios likely to be photo regions.

(7) In the block determination process of FIG. 19 according to the second embodiment described above, a machine learning model is used to determine whether a target block is a character block. However, another determination method may be used for determining whether target blocks are character blocks. For example, pattern images (binary images) for a plurality of characters may be pre-stored, and a method of pattern matching with the pattern images may be used to determine whether the target blocks are character blocks. In this case, the character probability Txr is not calculated and the CPU 210 may determine that a target block is a character block when there exists one or more pattern images whose agreement rate with the pattern obtained by binarizing the target block is greater than or equal to a threshold.

(8) In the block determination process according to the second embodiment described above, the CPU 210 determines whether a target block having (L×M) number of vertical pixels by (L×M) number of horizontal pixels is a character block, while shifting the target block M-number pixels at a time. Hence, a plurality of blocks is arranged in the scanned image SI2 so as to overlap each other (see FIG. 20). However, the plurality of blocks may be arranged in the scanned image SI2 so as not to overlap each other.

(9) In the block determination process according to the second embodiment described above, the CPU 210 determines whether the target block is one of a character block, a non-character block, and an unknown block. However, the CPU 210 may instead determine whether each target block is a character block or a non-character block. In this case, the threshold Tth1 used in S515 and the threshold Tth2 used in S525 should be the same value. For example, Tth1=Tth2=50%.

(10) In the second embodiment described above, when the CPU 210 determines that the target block is either a character block or a non-character block in S520 and S530 of FIG. 19, the CPU 210 sets the values in the block determination data for all pixels in the target block on the basis of the determination result. As an alternative, the CPU 210 may instead set only those values in the block determination data that correspond to pixels in the target block having a value specifying uncertainty to a value on the basis of the determination result. For example, take the case in which both the first block and the second block that overlap each other are determined to be a block other than an unknown block (i.e., a character block or a non-character block). In this case, the determination result for the block that came first in the order of determination processes between the first and second blocks may be given priority in the overlapping region of the first and second blocks.

(11) In the image process of FIGS. 2 and 16 in the first and second embodiments described above, the second binary image data generation process of S24 and the logical sum synthesizing process of S26 may be omitted. That is, the plurality of pixels specified in the first binary data generation process may be the final edge identification data.

(12) In the image process of FIGS. 2 and 16 in the first and second embodiments described above, the determination of S27 may be omitted. That is, the CPU 210 may always execute the processes of S28 and S29 or the processes of S78 and S79 irrespective of the enlargement ratio Lr at the time of generating the scan data.

(13) In the first binary image data generation process of FIG. 5 in the embodiments described above, the luminance image data is used as the single-component image data (S120). Alternatively, average component value image data may be used. Here, the average component value image data includes, as each pixel value, the average value of the three component values (R value, G value, and B value) included in the RGB value of the corresponding pixel in the scan data.

(14) Although the minimum component data is used (S300) in the second binary image data generation process of FIG. 9 in the embodiments described above, maximum component data or inverted minimum component data to be described below may be used.

The maximum component data includes a plurality of values corresponding to respective ones of the plurality of pixels included in the scan data, and each of the plurality of values is a maximum component value Vmax of the corresponding pixel in the scan data. The maximum component value Vmax is the maximum value among the plurality of component values (R value, G value, and B value) included in the RGB value of the corresponding pixel in the scan data.

The inverted minimum component data is acquired as follows. First, a plurality of inverted color values are generated for respective ones of the plurality of pixel values (RGB values) included in the scan data. Specifically, each of the inverted color values is generated by inverting the component values (R value, G value, and B value) included in the corresponding pixel value (RGB value). Assuming that an RGB value before inversion is represented by (Rin, Gin, Bin), an inverted RGB value (Rout, Gout, Bout) is expressed by the following expressions (1) to (3):

$$Rout = Rmax - Rin \quad (1)$$

$$Gout = Gmax - Gin \quad (2)$$

$$Bout = Bmax - Bin \quad (3)$$

The Rmax, Gmax, and Bmax in the above expressions are the maximum values that the respective R value, G value, and B value can take. In the embodiments described above, Rmax, Gmax, and Bmax are all 255. Image data which includes, as a plurality of pixel values, the plurality of inverted RGB values corresponding to respective ones of the plurality of pixels is generated as the inverted image data. Then, the inverted minimum component data is generated using the inverted image data. Specifically, inverted minimum component values VRmin are acquired from respective ones of the plurality of inverted RGB values included in the inverted image data. Each of the inverted minimum component values VRmin is the minimum value among the plurality of component values (R value, G value, and B value) included in the corresponding inverted RGB value. The inverted minimum component data is image data which includes the plurality of inverted minimum component values VRmin as a plurality of pixel values.

Each of the inverted minimum component values VRmin is the inverted value of the corresponding maximum component value, and the relationship VRmin=(255−Vmax) is satisfied. Thus, it can be said that both the maximum component data and inverted minimum component data are image data which includes a plurality of values (the inverted value of the maximum value or the maximum value itself), as respective ones of the plurality of pixel values, each of which is obtained on the basis of the maximum value among the plurality of component values included in corresponding one of the plurality of pixel values constituting the scan data. In addition, it can be said that the minimum component data of the embodiments is image data which includes a plurality of values, as respective ones of the plurality of pixel values, each of which is obtained on the basis of the minimum value among the plurality of component values included in corresponding one of the plurality of pixel values constituting the scan data.

As illustrated in FIGS. 10A to 10E, the maximum component values Vmax of the respective C, M, Y, K, and W are 255, 255, 255, 0, and 255. That is, the maximum component values Vmax have the same value except for that of black (K). Thus, in the maximum component data or inverted minimum component data, out of five types of elements constituting the halftone region, i.e., the C, M, Y, and K dots and the base color (white) of the paper, differences among the pixel values representing four types of elements of the C, M, and Y dots and the base color (white) of the paper can be reduced. As a result, when the maximum component data or inverted minimum component data is used, the identification of edge pixels originating from halftone dots can be suppressed as in the case where the minimum component data is used.

(15) In the embodiments described above, the character sharpening process is executed on the values of the character pixels (S40 of FIGS. 2 and 16), and the halftone smoothing process is executed on the values of the non-character pixels (S30 of FIGS. 2 and 16). Alternatively, an anti-alias process for improving appearance of characters may be executed on the values of the character pixels. Further, a process of washing out color (process of converting the pixel color into white) may be executed on the values of the non-character pixels for the purpose of reducing the amount of colorants for use in printing. In general, mutually different image processes are preferably executed on the values of the character pixels and the values of the non-character pixels. Alternatively, a specific image process may be executed on only one of the values of the character pixels and the values of the non-character pixels.

(16) In the embodiments described above, the Sobel filter is used in the edge extraction process executed in S130 of FIG. 5 or S320 of FIG. 9. Alternatively, another edge extraction filter such as a Roberts filter or a Laplacian filter may be used in the edge extraction process.

(17) In the embodiments described above, the scan data is used as the target image data, but the target image data is not limited to the scan data. Alternatively, the target image data may be generated by reading printed matter with a digital camera provided with a two-dimensional image sensor.

(18) In the embodiments described above, the edge identification data is generated by taking the logical sum of the first binary image data and second binary image data (S26 of FIGS. 2 and 16). Alternatively, the edge identification data may be generated by taking the logical sum of the first binary image data, second binary image data, and third binary image data. In this case, the third binary image data may be, for example, binary image data generated using the maximum component data described above. Thus, omission in identifications for edges of a character and the like can be further reduced.

(19) In the embodiments described above, the first binary image data generation process (FIG. 5) and second binary image data generation process (FIG. 9) may be appropriately altered. For example, a part or all of the edge enhancement process of S110 and level modification process of S140 in FIG. 5 may be omitted. Further, a part or all of the smoothing process of S310 and level modification process of S330 in FIG. 9 may be omitted.

(20) The image processing apparatus realizing the image process of FIG. 2 or FIG. 16 is not limited to the multifunction peripheral 200, but may be any one of various devices. For example, a scanner or a digital camera may execute the image process of FIG. 2 or FIG. 16 by using target image data generated by itself so as to generate print data to be supplied to a printer. Further, for example, a terminal device (the user terminal device 100, for example) or a server (not illustrated) that can communicate with a scanner and a printer may execute the image process of FIG. 2 or FIG. 16 by using scan data acquired from the scanner to generate print data to be supplied to the printer. Further, a plurality of computers (clout servers, for example) communicable with one another through a network may execute the image process as a whole while sharing the function required for the image process among them. In this case, the whole of the plurality of computers is an example of the image processing apparatus.

(21) In the embodiments described above, some of the configurations implemented through hardware may be replaced by software, and conversely, some or all of the configurations implemented through software may be replaced by hardware. For example, the process to calculate the character probability Txr using the machine learning model of S510 in FIG. 19 may be executed by dedicated hardware such as an ASIC.

While the description has been made in detail with reference to specific embodiments, the embodiments described above are an example for making the present disclosure easier to understand but does not limit the present disclosure. It would be apparent to those skilled in the art that various changes and modifications may be made thereto.

What is claimed is:

1. An image processing apparatus comprising a controller configured to perform:
   (a) acquiring target image data representing a target image, the target image including a plurality of pixels;
   (b) determining a plurality of candidate pixels from among the plurality of pixels, each of the plurality of first candidate pixels being a candidate to be a character pixel;
   (c) identifying a plurality of non-character pixels from among the plurality of pixels; and
   (d) identifying the character pixel other than the plurality of non-character pixels from among the plurality of candidate pixels.

2. The image processing apparatus according to claim 1, wherein the (c) identifying comprises:
   (c1) specifying a non-character region in the target image, the non-character region including a plurality of region pixels; and
   (c2) identifying the plurality of region pixels as the plurality of non-character pixels.

3. The image processing apparatus according to claim 2, wherein the controller is configured to further perform (e) executing an expansion process and a contraction process on the target image data to generate processed image data representing a processed image, the expansion process expanding an edge in the target image, the contraction process contracting the edge in the target image, and
   wherein the (c1) specifying specifies the non-character region in the processed image.

4. The image processing apparatus according to claim 1, wherein the controller is configured to further perform (f) specifying a plurality of edge pixels from among the plurality of pixels, the plurality of edge pixels constituting an edge in the target image, and
   wherein the (b) determining determines the plurality of candidate pixels from among the plurality of edge pixels.

5. The image processing apparatus according to claim 1, wherein the target image data includes a plurality of pixel values corresponding to respective ones of the plurality of pixels, each of the plurality of pixel values including a plurality of component values, and
   wherein the (b) determining comprises:
   (b1) generating luminance image data representing a luminance image, the luminance image data including a plurality of luminance values corresponding to respective ones of the plurality of pixels, each of the plurality of luminance values being calculated using the plurality of component values included in corresponding one of the plurality of pixel values;
   (b2) specifying a plurality of first edge pixels using the luminance image data, the plurality of first edge pixels constituting an edge in the luminance image;
   (b3) generating minimum component data representing a minimum component image, the minimum component data including a plurality of minimum component values corresponding to respective ones of the plurality of pixels, each of the plurality of minimum component values being a minimum value among the plurality of component values included in corresponding one of the plurality of pixel values;
   (b4) specifying a plurality of second edge pixels using the minimum component data, the plurality of second edge pixels constituting an edge in the minimum component image; and
   (b5) identifying the plurality of candidate pixels from among the plurality of pixels, the plurality of candidate pixels being included at least one of the plurality of first edge pixels and the plurality of the second edge pixels.

6. An image processing method comprising:
acquiring target image data representing a target image, the target image including a plurality of pixels;
determining a plurality of candidate pixels from among the plurality of pixels, each of the plurality of first candidate pixels being a candidate to be a character pixel;
identifying a plurality of non-character pixels from among the plurality of pixels; and
identifying the character pixel other than the plurality of non-character pixels from among the plurality of candidate pixels.

* * * * *